US012509649B2

(12) United States Patent
Hoefte et al.

(10) Patent No.: US 12,509,649 B2
(45) Date of Patent: Dec. 30, 2025

(54) METHODS AND APPARATUSES FOR AUTOMATIC DISHWASHING CHEMICAL DISTRIBUTION

(71) Applicant: The Procter & Gamble Company, Cincinnati, OH (US)

(72) Inventors: Paulus Antonius Augustinus Hoefte, Astene (BE); Vincent Hubert Monique De Wilde, Holsbeek (BE)

(73) Assignee: The Procter & Gamble Company, Cincinnati, OH (US)

( * ) Notice: Subject to any disclaimer, the term of this patent is extended or adjusted under 35 U.S.C. 154(b) by 294 days.

(21) Appl. No.: 18/467,983

(22) Filed: Sep. 15, 2023

(65) Prior Publication Data

US 2024/0093131 A1 Mar. 21, 2024

Related U.S. Application Data

(60) Provisional application No. 63/419,430, filed on Oct. 26, 2022, provisional application No. 63/407,271, filed on Sep. 16, 2022.

(51) Int. Cl.

| | |
|---|---|
| ***C11D 17/04*** | (2006.01) |
| ***A47L 15/44*** | (2006.01) |
| ***B65D 1/36*** | (2006.01) |
| ***B65D 51/16*** | (2006.01) |
| ***B65D 75/36*** | (2006.01) |
| ***B65D 77/20*** | (2006.01) |
| ***B65D 85/804*** | (2006.01) |

(52) U.S. Cl.

CPC ........ *C11D 17/046* (2013.01); *A47L 15/4418* (2013.01); *A47L 15/4463* (2013.01);

(Continued)

(58) Field of Classification Search

CPC ............... C11D 17/046; C11D 2111/14; A47L 15/4418; A47L 15/4463; A47L 15/4472;

(Continued)

(56) References Cited

U.S. PATENT DOCUMENTS 8,382,913 B2 * 2/2013 Classen ............... A47L 15/0055 68/17 R
8,484,999 B2 * 7/2013 Classen ............... A47L 15/4472 68/17 R (Continued)

FOREIGN PATENT DOCUMENTS

EP 1247483 A1 10/2002
WO 2017182652 A2 10/2017

OTHER PUBLICATIONS

EPO Search Report and Opinion for Application No. 23197798.4; dated Feb. 8, 2024, 07 pages.

(Continued)

*Primary Examiner* — David J Walczak

(74) *Attorney, Agent, or Firm* — Elizabeth A. Conklin; Carolyn S. Powell

(57) ABSTRACT

A partitioned solution cartridge for automatic distribution of dishwashing chemicals includes a protective top film and a compartmentalized body including a plurality of contained solution sectors each including a fluid reservoir and a distribution chamber. The fluid reservoir is partially enclosed by a reservoir sidewall and the protective top film. The distribution chamber is partially enclosed by a chamber sidewall and the protective top film. The fluid reservoir and the distribution chamber are fluidly connected.

20 Claims, 13 Drawing Sheets

(52) U.S. Cl.
CPC ............ *A47L 15/4472* (2013.01); *B65D 1/36* (2013.01); *B65D 51/16* (2013.01); *B65D 75/367* (2013.01); *B65D 77/20* (2013.01); *B65D 77/2024* (2013.01); *B65D 85/8058* (2020.05); *B65D 85/8067* (2020.05); *B65D 2205/02* (2013.01); *C11D 2111/14* (2024.01)

(58) Field of Classification Search
CPC ..... A47L 15/449; A47L 15/4454; B65D 1/36; B65D 75/367; B65D 77/20; B65D 85/8067; B65D 85/8058; B65D 51/16; B65D 77/2024; B65D 2205/02; D06F 39/022
USPC ..... 222/325, 432, 435, 437; 134/56 R, 56 D, 134/94.1, 95.1, 57 D, 58 R, 58 D, 18, 134/25.2, 68.17 R, 57 R
See application file for complete search history.

(56) References Cited

U.S. PATENT DOCUMENTS 8,613,805 B2 * 12/2013 Classen ............... A47L 15/4463 68/17 R
9,510,727 B2 12/2016 Classen
2002/0088502 A1 * 7/2002 Van Rompuy ........ D06F 39/024 141/1
2007/0144558 A1 * 6/2007 Classen ............... A47L 15/4418 134/94.1

OTHER PUBLICATIONS

EPO Search Report and Opinion for Application No. 23197797.6; dated Feb. 8, 2024, 07 pages.
EPO Search Report and Opinion for Application No. 23197795.0; dated Feb. 8, 2024, 08 pages.
EPO Search Report and Opinion for Application No. 23197794.3; dated Feb. 8, 2024, 07 pages.
All Office Actions; U.S. Appl. No. 18/467,930, filed Sep. 15, 2023.
All Office Actions; U.S. Appl. No. 18/467,958, filed Sep. 15, 2023.
All Office Actions; U.S. Appl. No. 18/468,045, filed Sep. 15, 2023.
Unpublished U.S. Appl. No. 18/467,930, filed Sep. 15, 2023, to Paulus Antonius Augustinus Hoefte et al.
Unpublished U.S. Appl. No. 18/467,958, filed Sep. 15, 2023, to Paulus Antonius Augustinus Hoefte et al.
Unpublished U.S. Appl. No. 18/468,045, filed Sep. 15, 2023, to Paulus Antonius Augustinus Hoefte et al.

* cited by examiner

METHODS AND APPARATUSES FOR AUTOMATIC DISHWASHING CHEMICAL DISTRIBUTION

TECHNICAL FIELD

The present disclosure is directed to methods and apparatuses for automatic dishwashing chemical distribution.

BACKGROUND

Dishwashing detergent compositions are used in automatic dishwashing machines to provide numerous benefits including a good cleaning profile and a good shine profile. The dishwashing detergent compositions have conventionally been provided to the automatic dishwashing machine either through the consumer pouring dishwashing detergent liquid directly into the dishwashing machine, directly placing a dishwashing detergent tablet into the dishwashing machine, or through the consumer placing an encapsulated detergent "water-soluble pouch" into the dishwashing machine.

SUMMARY

However, conventional detergent liquids, tablets, and pods do not have a way to provide discrete chemicals to the dishwashing machine independently of each other. Providing chemicals to the dishwashing machine separately from each other allow the dishwashing machine to administer the chemicals separately at different times of the cleaning cycle and allow for chemicals that may not otherwise be stable in the presence of each other to be provided in one container. The present disclosure addresses this need by providing a partitioned solution cartridge for automatic distribution of dishwashing chemicals that has a compartmentalized body including a plurality of contained solution sectors, where different chemicals may be stored and individually metered out to the dishwashing machine. The partitioned solution cartridge is a multi-use cartridge that can last 20 or more or 30 or more washing cycles.

According to an embodiment of the present disclosure, a partitioned solution cartridge for automatic distribution of dishwashing chemicals includes a protective top film and a compartmentalized body including a plurality of contained solution sectors each including a fluid reservoir and a distribution chamber. The fluid reservoir is partially enclosed by a reservoir sidewall and the protective top film. The distribution chamber is partially enclosed by a chamber sidewall and the protective top film. The fluid reservoir and the distribution chamber are fluidly connected, and when the partitioned solution cartridge is positioned in a substantially vertical orientation, for each of the plurality of contained solution sectors the fluid reservoir is positioned vertically above the distribution chamber such that fluid from the fluid reservoir flows via gravity draining to the distribution chamber.

In accordance with another embodiment of the present disclosure, a partitioned solution cartridge for automatic distribution of dishwashing chemicals includes a protective top film and a compartmentalized body including a plurality of contained solution sectors each including a fluid reservoir and a distribution chamber. The fluid reservoir is partially enclosed by a reservoir sidewall and the protective top film. The distribution chamber is partially enclosed by a chamber sidewall and the protective top film. The fluid reservoir and the distribution chamber are fluidly connected, the fluid reservoir has a reservoir depth, the distribution chamber has a chamber depth, and the reservoir depth is greater than the chamber depth.

In accordance with another embodiment of the present disclosure, a partitioned solution cartridge for automatic distribution of dishwashing chemicals includes a protective top film and a compartmentalized body including a plurality of contained solution sectors each including a fluid reservoir and a distribution chamber. The fluid reservoir is partially enclosed by a reservoir sidewall and the protective top film. The distribution chamber is partially enclosed by a chamber sidewall and the protective top film. The fluid reservoir and the distribution chamber are fluidly connected, and the plurality of contained solution sectors are fluidly separated from each other within the compartmentalized body via heat seals.

In accordance with another embodiment of the present disclosure, a partitioned solution cartridge for automatic distribution of dishwashing chemicals includes a protective top film and a compartmentalized body including a display aperture and a plurality of contained solution sectors each including a fluid reservoir positioned proximate an upper end of the compartmentalized body and a distribution chamber proximate a lower end of the compartmentalized body. The fluid reservoir is partially enclosed by a reservoir sidewall and the protective top film. The distribution chamber is partially enclosed by a chamber sidewall and the protective top film. The fluid reservoir and the distribution chamber are fluidly connected, and the display aperture is positioned between the plurality of contained solution sectors and the lower end of the compartmentalized body.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
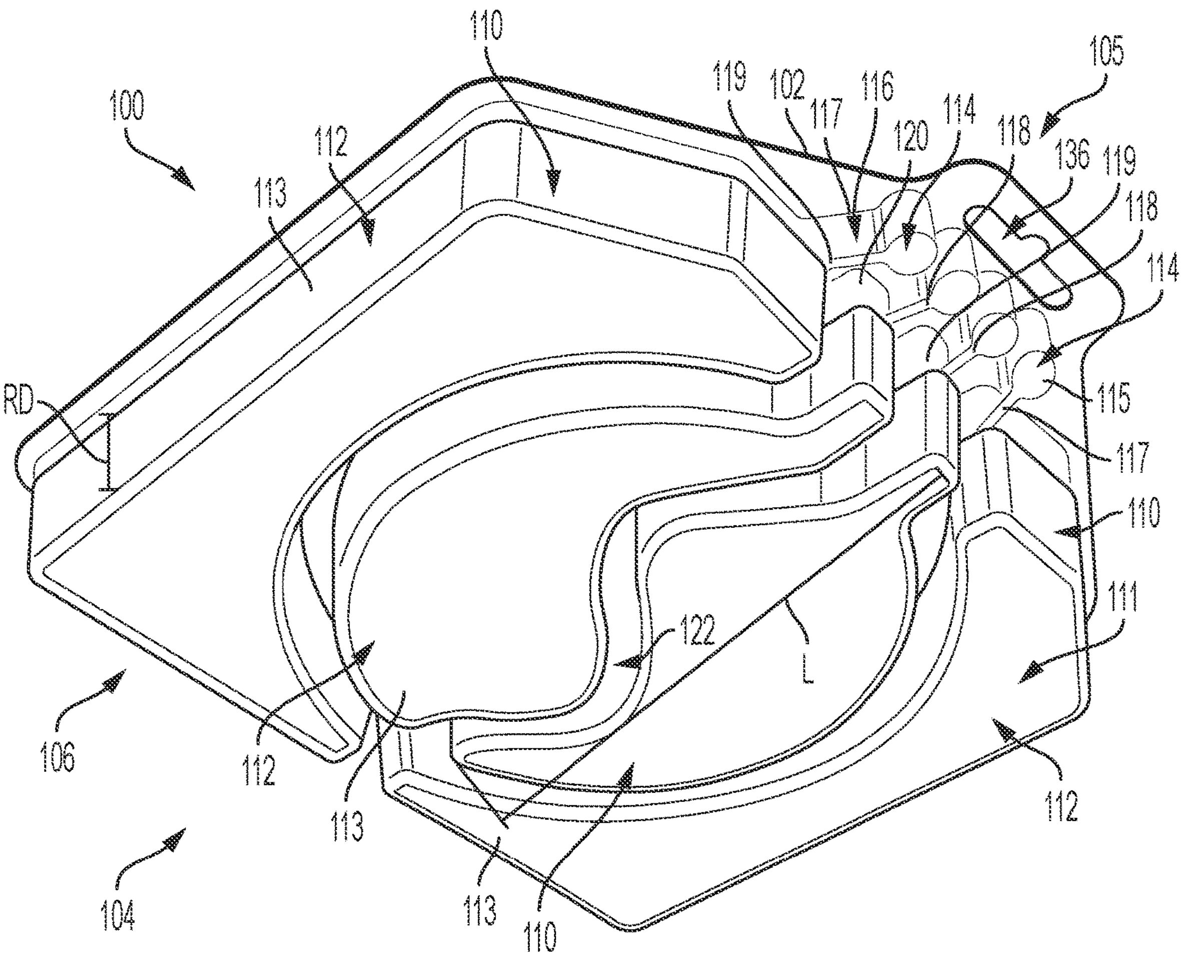
FIG. 1 is a perspective view of a partitioned solution cartridge, according to the present disclosure.
Figure 2:
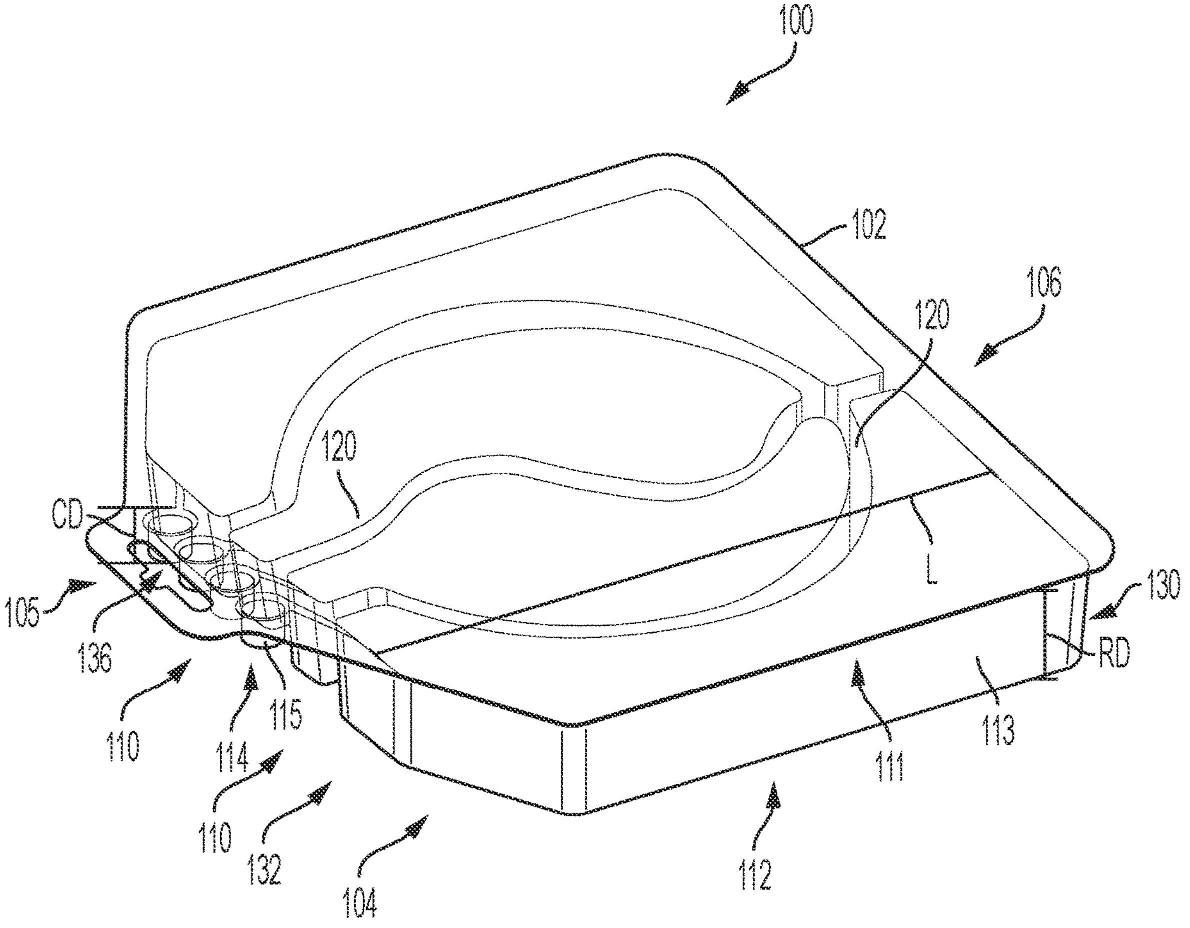
FIG. 2 is a perspective view of a partitioned solution cartridge, according to the present disclosure.
Figure 3:
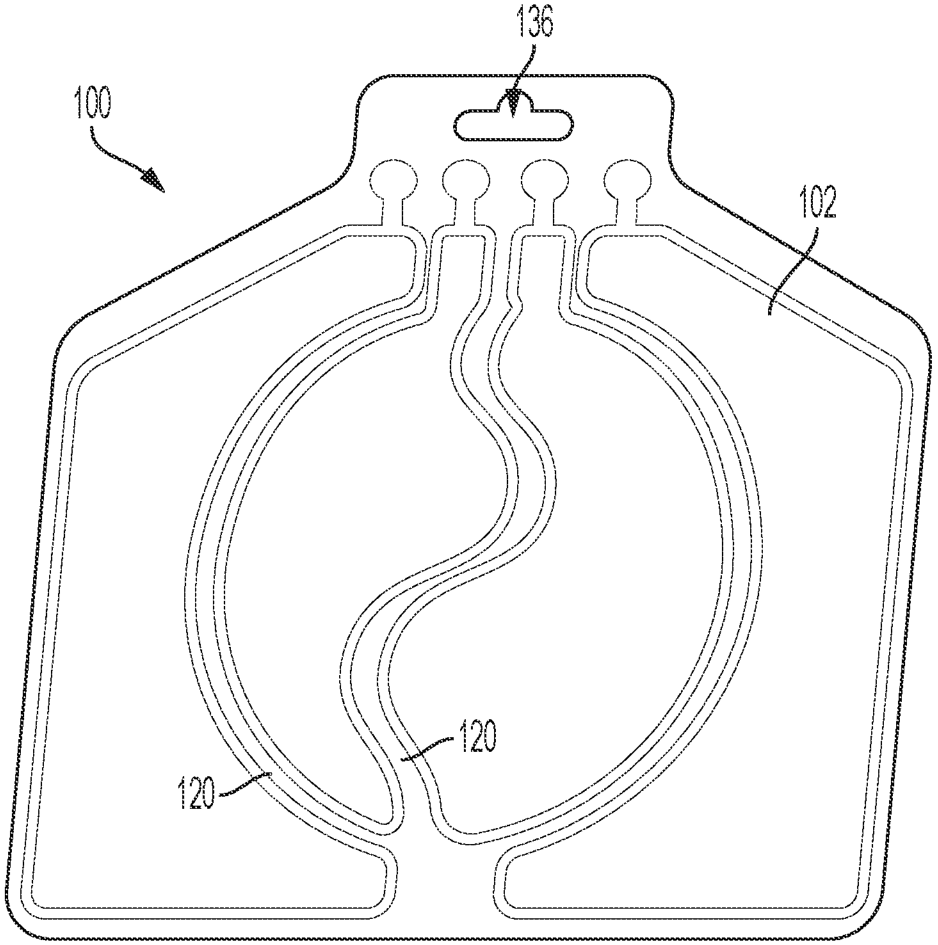
FIG. 3 is a top-down view of a partitioned solution cartridge, according to the present disclosure.

Referring initially to FIGS. 1-3, the present disclosure relates to a partitioned solution cartridge 100 for automatic distribution of dishwashing chemicals including a protective top film 102 and a compartmentalized body 104. The protective top film 102, the compartmentalized body 104, or both, may include any suitable heat or induction sealable thermoplastic polymers. Suitable sealable thermoplastic polymers may include polyethylene (PE), polypropylene (PP), polyethylene terephthalate (PET), polyethylene terephthalate glycol (PETG), acrylonitrile butadiene styrene (ABS), polycarbonate (PC), ethylene vinyl alcohol, aluminum, or combinations thereof. The thermoplastic polymers may be with or without further moisture, oxygen or gas, oil or perfume barrier layers like aluminum, ethylene vinyl alcohol, or both. In embodiments, the thermoplastic polymers may have high recycled content (up to 100%) including recycled PET, recycled PP, recycled PE, bioplastic sourced from renewable sources, or combinations thereof.

The compartmentalized body 104 includes a plurality of contained solution sectors 110. The plurality of contained solution sectors 110 may each including a fluid reservoir 112 and a distribution chamber 114. It is contemplated that the plurality of contained solution sectors 110 may include more than one fluid reservoir 112 connected to a single distribution chamber 114, such as 2 to 5 fluid reservoirs 112, 2 to 4 fluid reservoirs 112, 3 to 5 fluid reservoirs 112, 2 fluid reservoirs 112, 3 fluid reservoirs 112, 4 fluid reservoirs 112, or 5 fluid reservoirs 112. The plurality of contained solution sectors 110 may include 2 or more, 3 or more, 4 or more, 5 or more, 6 or more, from 2 to 20, from 2 to 15, from 2 to 10, from 2 to 8, from 2 to 6, from 2 to 5, from 2 to 4, from 3 to 20, from 3 to 15, from 3 to 10, from 3 to 8, from 3 to 6, from 3 to 5, from 4 to 20, from 4 to 15, from 4 to 10, from 4 to 8, from 4 to 6, from 5 to 20, from 5 to 15, from 5 to 10, from 5 to 8, from 6 to 20, from 6 to 15, from 6 to 10, from 6 to 8, from 8 to 20, from 8 to 15, from 8 to 10, from 10 to 20, from 10 to 15, from 15 to 20, or any values within the foregoing ranges or any ranges created thereby, contained solution sectors 110.

In embodiments, the plurality of contained solution sectors 110 may be fluidly separated from each other within the compartmentalized body 104. For example, and not by way of limitation, the plurality of contained solution sectors 110 may be fluidly separated via plastic seals. In embodiments, the plastic seals may include heat seals 120. The heat seals 120 may be curved. In embodiments, the heat seals 120 may be asymmetrical to each other. Additionally or alternatively, the plurality of contained solution sectors 110 may be fluidly separated via air gaps 122. It is contemplated that the shape, curvature, or both of the heat seals 120, the air gaps 122, or both, prevent folding of the partitioned solution cartridge 100 when the partitioned solution cartridge 100 includes fluid 111. The partitioned solution cartridge 100 may not include any folding lines that run across the entire length of the partitioned solution cartridge 100 in any direction such that when the plurality of contained solution sectors 110 have fluid 111, the partitioned solution cartridge 100 cannot be folded by hand. It is contemplated that the separation and shaping of the plurality of contained solution sectors 110 and lack of folding lines present in the partitioned solution cartridge 100 provides sufficient stiffness, rigidity, or both to the partitioned solution cartridge 100 to prevent damage, deformation, or both throughout the manufacturing and supply chain and consumer handling in-use while minimizing the plastic weight and assuring a good consumer quality impression. This lack of folding lines may be achieved in any way suitable. Some nonlimiting example partitioned solution cartridges that lack folding lines that run across the entire length of the partitioned solution cartridge in any direction are shown in FIGS. 1 and 11-15.

The plurality of contained solution sectors 110 may have a total combined volume from 0.1 to 2 liters (l), from 0.1 to 1.7 l, from 0.1 to 1.5 l, from 0.1 to 1.2 l, from 0.1 to 1 l, from 0.1 to 0.9 l, from 0.1 to 0.8 l, from 0.1 to 0.7 l, from 0.1 to 0.6 l, from 0.1 to 0.5 l, from 0.1 to 0.4 l, from 0.1 to 0.3 l, from 0.1 to 0.2 l, from 0.2 to 2 l, from 0.2 to 1.7 l, from 0.2 to 1.5 l, from 0.2 to 1.2 l, from 0.2 to 1 l, from 0.2 to 0.9 l, from 0.2 to 0.8 l, from 0.2 to 0.7 l, from 0.2 to 0.6 l, from 0.2 to 0.5 l, from 0.2 to 0.4 l, from 0.2 to 0.3 l, from 0.3 to 2 l, from 0.3 to 1.7 l, from 0.3 to 1.5 l, from 0.3 to 1.2 l, from 0.3 to 1l, from 0.3 to 0.9 l, from 0.3 to 0.8 l, from 0.3 to 0.7 l, from 0.3 to 0.6 l, from 0.3 to 0.5 l, from 0.3 to 0.4 l, from 0.4 to 2 l, from 0.4 to 1.7 l, from 0.4 to 1.5 l, from 0.4 to 1.2 l, from 0.4 to 1 l, from 0.4 to 0.9 l, from 0.4 to 0.8 l, from 0.4 to 0.7 l, from 0.4 to 0.6 l, from 0.4 to 0.5 l, from 0.5 to 2 l, from 0.5 to 1.7 l, from 0.5 to 1.5 l, from 0.5 to 1.2 l, from 0.5 to 1l, from 0.5 to 0.9 l, from 0.5 to 0.8 l, from 0.5 to 0.7 l, from 0.5 to 0.6 l, from 0.6 to 2 l, from 0.6 to 1.7 l, from 0.6 to 1.5 l, from 0.6 to 1.2 l, from 0.6 to 1l, from 0.6 to 0.9 l, from 0.6 to 0.8 l, from 0.6 to 0.7 l, from 0.7 to 2 l, from 0.7 to 1.7 l, from 0.7 to 1.5 l, from 0.7 to 1.2 l, from 0.7 to 1l, from 0.7 to 0.9 l, from 0.7 to 0.8 l, from 0.8 to 2 l, from 0.8 to 1.7 l, from 0.8 to 1.5 l, from 0.8 to 1.2 l, from 0.8 to 1 l, from 0.8 to 0.9 l, from 0.9 to 2 l, from 0.9 to 1.7 l, from 0.9 to 1.5 l, from 0.9 to 1.2 l, from 0.9 to 1l, from 1 to 2l, from 1 to 1.7 l, from 1 to 1.5 l, from 1 to 1.2l, from 1.2 to 2l, from 1.2 to 1.7 l, from 1.2 to 1.5 l, from 1.5 to 2 l, from 1.5 to 1.7 l, from 1.7 to 2 l, or any values within the foregoing ranges or any ranges created thereby. Additionally or alternatively, the plurality of contained solution sectors 110 may include from 10 to 60, from 10 to 50, from 10 to 40, from 10 to 30, from 10 to 20, from 20 to 60, from 20 to 50, from 20 to 40, from 20 to 30, from 30 to 60, from 30 to 50, from 30 to 40, from 40 to 60, from 40 to 50, from 50 to 60, or any values within the foregoing ranges or any ranges created thereby total dosages, wash cycles, or both.

The plurality of contained solution sectors 110 may have any shape suitable to contain fluid. The plurality of contained solution sectors 110 may each have a cylindrical shape, a spherical shape, an ovoid shape, a conical shape, a cuboid shape, a rectangular prism shape, or combinations thereof. The plurality of contained solution sectors 110 may each be differently shaped from each other. In embodiments, the plurality of contained solution sectors 110 include fluid 111. The fluid 111 included within the plurality of contained solution sectors 110 may have any composition suitable for dishwashing. The fluid 111 may include an automatic dishwashing detergent composition. It is contemplated that each of the plurality of contained solution sectors 110 may include chemically-distinct fluids 111. The chemically-distinct fluids may include alkaline and non-alkaline solutions made of surfactants, enzymes, bleach, bleach activators, bleach catalysts chelant/builders, solvents and buffers, independent of each other or in combination.

As previously disclosed, the plurality of contained solution sectors 110 each have a fluid reservoir 112. The fluid reservoir 112 is partially enclosed by a reservoir sidewall 113 and the protective top film 102. The reservoir sidewall 113 may be sealed to the protective top film 102 via any suitable plastic welding techniques known in the art, including heat sealing, induction sealing, solvent welding, ultrasonic welding, laser welding, or combinations thereof. In embodiments, the reservoir sidewall 113 may be heat sealed to the protective top film 102 (as shown by heat seals 120). The fluid reservoir 112 may be positioned proximate an upper end 106 of the compartmentalized body 104. The fluid reservoir 112 may have any shape suitable to contain fluid 111. The fluid reservoir 112 may each have a cylindrical shape, a spherical shape, an ovoid shape, a conical shape, a cuboid shape, a rectangular prism shape, or combinations thereof. In embodiments, each fluid reservoir 112 of the plurality of contained solution sectors 110 are each differently shaped from each other. Additionally or alternatively, at least two of the fluid reservoirs 112 of the plurality of contained solution sectors 110 may have mirrored symmetry.

In embodiments, the fluid reservoir 112 has a top end 130 and a bottom end 132 formed by the reservoir sidewall 113. The bottom end 132 is positioned proximate to the distribution chamber 114 and the top end 130 is positioned opposite the bottom end 132.

The fluid reservoir 112 has an overall length L defined by the top end 130 and the bottom end 132. The overall length L may range from 5 cm to 500 cm, from 5 cm to 100 cm, from 5 cm to 75 cm, from 5 cm to 50 cm, from 5 cm to 25 cm, from 25 cm to 500 cm, from 25 cm to 100 cm, from 25 cm to 75 cm, from 25 cm to 50 cm, from 50 cm to 500 cm, from 50 cm to 100 cm, from 50 cm to 75 cm, from 75 cm to 500 cm, from 75 cm to 100 cm, from 100 cm to 500 cm, or any values within the foregoing ranges or any ranges created thereby.

The fluid reservoir 112 may have a reservoir depth RD from 0.1 to 6 cm, from 0.1 to 5.5 cm, from 0.1 to 5 cm, from 0.1 to 4.5 cm, from 0.1 to 4 cm, from 0.1 to 3.5 cm, from 0.1 to 3 cm, from 0.1 to 2.5 cm, from 0.1 to 2 cm, from 0.1 to 1.5 cm, from 0.1 to 1 cm, from 0.1 to 0.5 cm, from 0.5 to 6 cm, from 0.5 to 5.5 cm, from 0.5 to 5 cm, from 0.5 to 4.5 cm, from 0.5 to 4 cm, from 0.5 to 3.5 cm, from 0.5 to 3 cm, from 0.5 to 2.5 cm, from 0.5 to 2 cm, from 0.5 to 1.5 cm, from 0.5 to 1 cm, from 1 to 6 cm, from 1 to 5.5 cm, from 1 to 5 cm, from 1 to 4.5 cm, from 1 to 4 cm, from 1 to 3.5 cm, from 1 to 3 cm, from 1 to 2.5 cm, from 1 to 2 cm, from 1 to 1.5 cm, from 1.5 to 6 cm, from 1.5 to 5.5 cm, from 1.5 to 5 cm, from 1.5 to 4.5 cm, from 1.5 to 4 cm, from 1.5 to 3.5 cm, from 1.5 to 3 cm, from 1.5 to 2.5 cm, from 1.5 to 2 cm, from 2 to 6 cm, from 2 to 5.5 cm, from 2 to 5 cm, from 2 to 4.5 cm, from 2 to 4 cm, from 2 to 3.5 cm, from 2 to 3 cm, from 2 to 2.5 cm, from 2.5 to 6 cm, from 2.5 to 5.5 cm, from 2.5 to 5 cm, from 2.5 to 4.5 cm, from 2.5 to 4 cm, from 2.5 to 3.5 cm, from 2.5 to 3 cm, from 3 to 6 cm, from 3 to 5.5 cm, from 3 to 5 cm, from 3 to 4.5 cm, from 3 to 4 cm, from 3 to 3.5 cm, from 3.5 to 6 cm, from 3.5 to 5.5 cm, from 3.5 to 5 cm, from 3.5 to 4.5 cm, from 3.5 to 4 cm, from 4 to 6 cm, from 4 to 5.5 cm, from 4 to 5 cm, from 4 to 4.5 cm, from 4.5 to 6 cm, from 4.5 to 5.5 cm, from 4.5 to 5 cm, from 5 to 6 cm, from 5 to 5.5 cm, from 5.5 to 6 cm, or any values within the foregoing ranges or any ranges created thereby.

Additionally, as previously stated, each of the plurality of contained solution sectors 110 include a distribution chamber 114. The distribution chamber 114 is partially enclosed by a chamber sidewall 115 and the protective top film 102. The chamber sidewall 115 may be heat sealed to the protective top film 102 by heat seals 120. In embodiments, the chamber sidewall 115 has a rigidity greater than the rigidity of the reservoir sidewall 113. The distribution chamber 114 may be positioned proximate a lower end 105 of the compartmentalized body 104. The distribution chamber 114 may have any shape suitable to distribute fluid from the distribution chamber 114 when the chamber sidewall 115 is punctured. In embodiments, the distribution chamber 114 may have a cylindrical shape, a spherical shape, an ovoid shape, a conical shape, a cuboid shape, a rectangular prism shape, or combinations thereof.

The distribution chamber 114 may have a chamber depth CD. The chamber depth CD may be from 0.1 to 6 cm, from 0.1 to 5.5 cm, from 0.1 to 5 cm, from 0.1 to 4.5 cm, from 0.1 to 4 cm, from 0.1 to 3.5 cm, from 0.1 to 3 cm, from 0.1 to 2.5 cm, from 0.1 to 2 cm, from 0.1 to 1.5 cm, from 0.1 to 1 cm, from 0.1 to 0.5 cm, from 0.5 to 6 cm, from 0.5 to 5.5 cm, from 0.5 to 5 cm, from 0.5 to 4.5 cm, from 0.5 to 4 cm, from 0.5 to 3.5 cm, from 0.5 to 3 cm, from 0.5 to 2.5 cm, from 0.5 to 2 cm, from 0.5 to 1.5 cm, from 0.5 to 1 cm, from 1 to 6 cm, from 1 to 5.5 cm, from 1 to 5 cm, from 1 to 4.5 cm, from 1 to 4 cm, from 1 to 3.5 cm, from 1 to 3 cm, from 1 to 2.5 cm, from 1 to 2 cm, from 1 to 1.5 cm, from 1.5 to 6 cm, from 1.5 to 5.5 cm, from 1.5 to 5 cm, from 1.5 to 4.5 cm, from 1.5 to 4 cm, from 1.5 to 3.5 cm, from 1.5 to 3 cm, from 1.5 to 2.5 cm, from 1.5 to 2 cm, from 2 to 6 cm, from 2 to 5.5 cm, from 2 to 5 cm, from 2 to 4.5 cm, from 2 to 4 cm, from 2 to 3.5 cm, from 2 to 3 cm, from 2 to 2.5 cm, from 2.5 to 6 cm, from 2.5 to 5.5 cm, from 2.5 to 5 cm, from 2.5 to 4.5 cm, from 2.5 to 4 cm, from 2.5 to 3.5 cm, from 2.5 to 3 cm, from 3 to 6 cm, from 3 to 5.5 cm, from 3 to 5 cm, from 3 to 4.5 cm, from 3 to 4 cm, from 3 to 3.5 cm, from 3.5 to 6 cm, from 3.5 to 5.5 cm, from 3.5 to 5 cm, from 3.5 to 4.5 cm, from 3.5 to 4 cm, from 4 to 6 cm, from 4 to 5.5 cm, from 4 to 5 cm, from 4 to 4.5 cm, from 4.5 to 6 cm, from 4.5 to 5.5 cm, from 4.5 to 5 cm, from 5 to 6 cm, from 5 to 5.5 cm, from 5.5 to 6 cm, or any values within the foregoing ranges or any ranges created thereby. In embodiments, the reservoir depth RD of the fluid reservoir 112 may be greater than the chamber depth CD. For example, and not by way of limitation, the chamber depth CD may be from 10% to 90%, from 10% to 80%, from 10% to 70%, from 10% to 60%, from 10% to 50%, from 10% to 40%, from 10% to 30%, from 10% to 20%, from 20% to 90%, from 20% to 80%, from 20% to 70%, from 20% to 60%, from 20% to 50%, from 20% to 40%, from 20% to 30%, from 30% to 90%, from 30% to 80%, from 30% to 70%, from 30% to 60%, from 30% to 50%, from 30% to 40%, from 40% to 90%, from 40% to 80%, from 40% to 70%, from 40% to 60%, from 40% to 50%, from 50% to 90%, from 50% to 80%, from 50% to 70%, from 50% to 60%, from 60% to 90%, from 60% to 80%, from 60% to 70%, from 70% to 90%, from 70% to 80%, from 80% to 90%, or any values within the foregoing ranges or any ranges created thereby, of the reservoir depth RD.

The fluid reservoir 112 and the distribution chamber 114 are fluidly connected. In embodiments, the fluid reservoir 112 and the distribution chamber 114 are fluidly connected by a gravity drainage passage 116. The gravity drainage passage 116 may have an entrance 118 defined by the reservoir sidewall 113 and an endpoint 119 defined by the chamber sidewall 115. The gravity drainage passage 116 may be partially enclosed by a passage sidewall 117 and the protective top film 102.

Referring now to FIGS. 1-3, 6, and 8, the distribution chamber 114 may include a concave notch 140 positioned opposite the protective top film 102 on the chamber sidewall 115. The concave notch 140 may include a piercing point (not shown) located substantially in the center of the concave notch 140. The concave shape of the concave notch 140 helps the piercing means 160 find the right location (auto centering). The concave shape further helps to prevent leakage, spillage, or both when the partitioned solution cartridge 100 is taken out of the automatic dishwashing machine 150 when the partitioned solution cartridge 100 has a reduced fluid amount as compared to the full fluid amount. The concave shape of the concave notch 140 further helps to create a "resealing" of the piercing point after removal of the partitioned solution cartridge 100. Additionally or alternatively, it is contemplated that the concave notch 140 may have a reduced thickness as compared to the thickness of the chamber sidewall 115 outside of the concave notch 140, thereby making it easier to puncture. The piercing point could also have a normally closed duckbill valve or a one way valve that gets opened up upon engaging with the receiver. It is further contemplated that the exterior cylindrical shape of the distribution chamber 114 helps to seal the partitioned solution cartridge 100 connection to the storage receptacle 154 liquid tight with an o-ring or other circular seal in the receiver.

Figure 10:
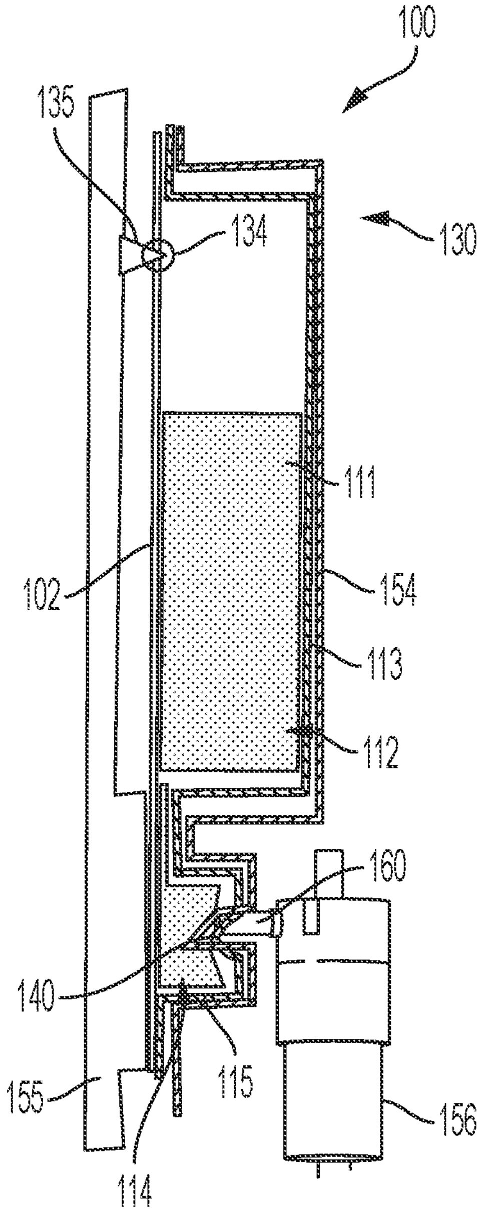
FIG. 10 is a schematic of a partitioned solution cartridge vertically positioned within a storage receptacle, according to the present disclosure.
Figure 11:
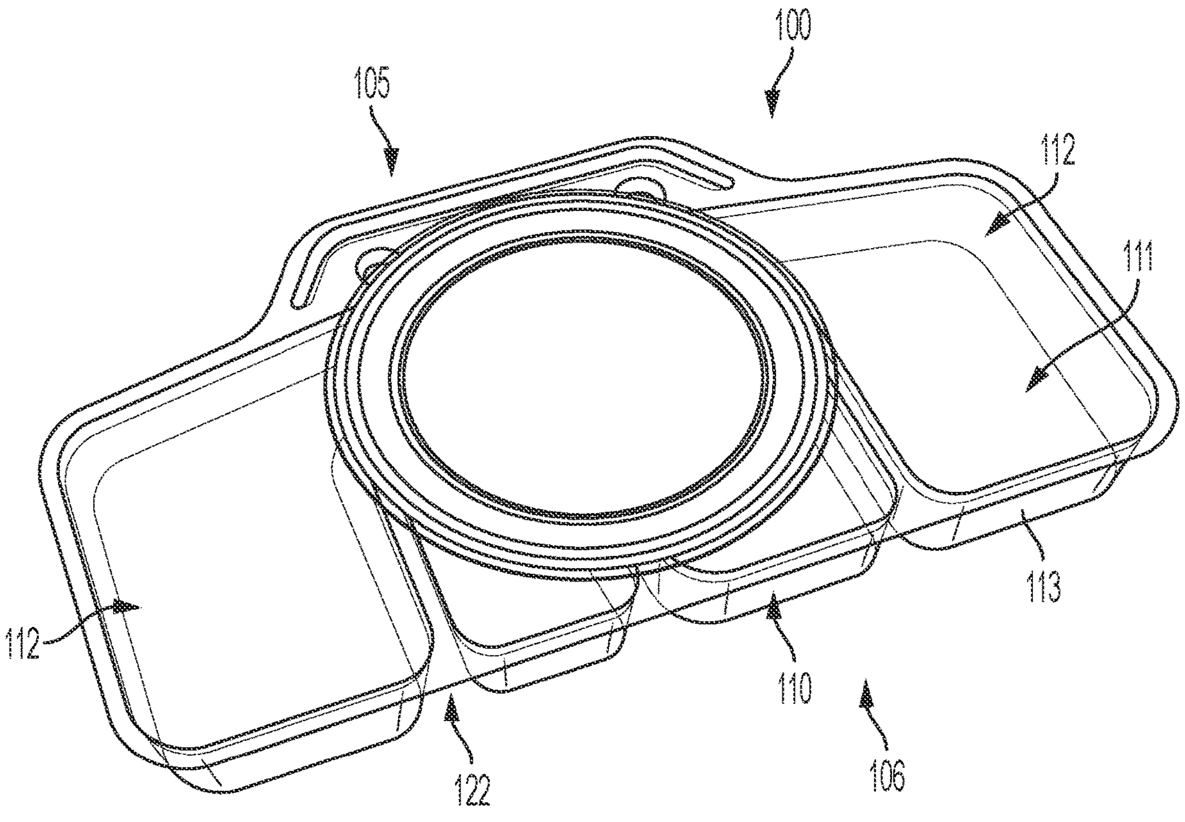
FIG. 11 is a perspective view of a partitioned solution cartridge, according to the present disclosure.
Figure 12:
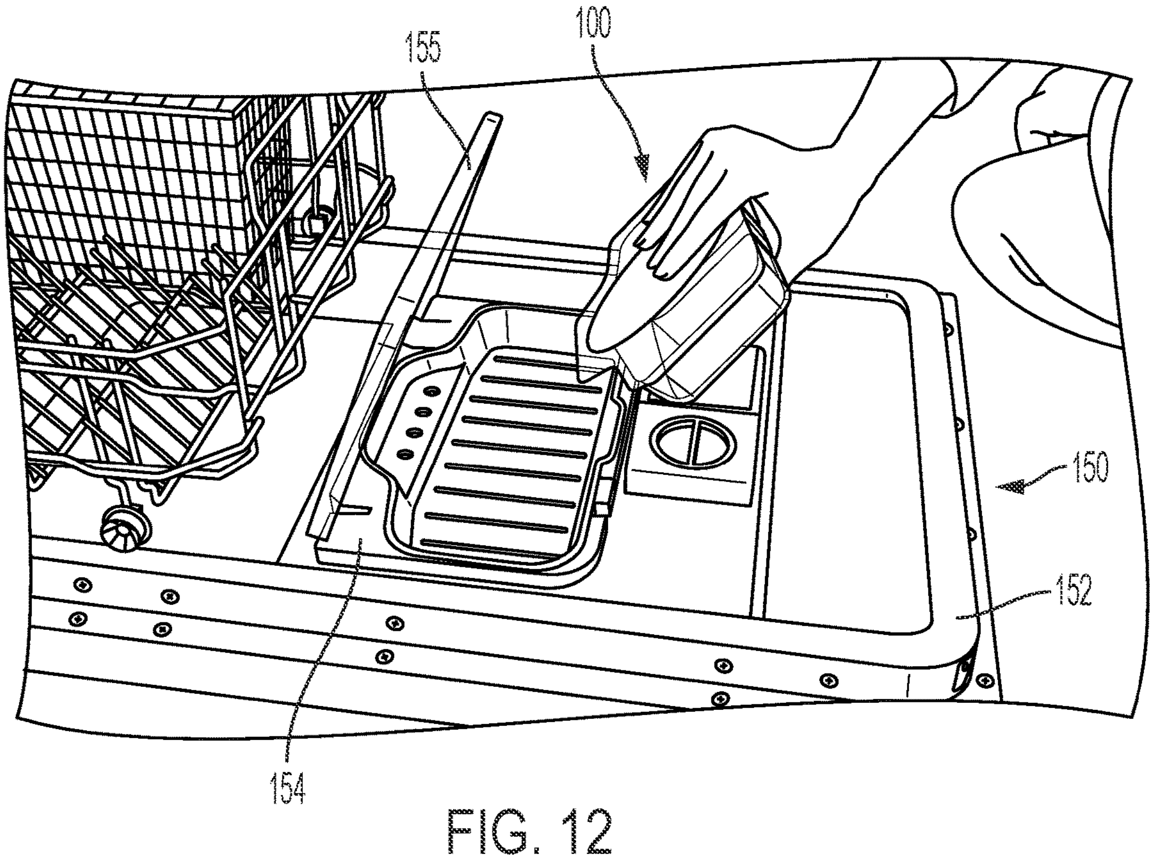
FIG. 12 is a perspective view is of a partitioned solution cartridge being positioned within a storage receptacle, according to the present disclosure.
Figure 13:
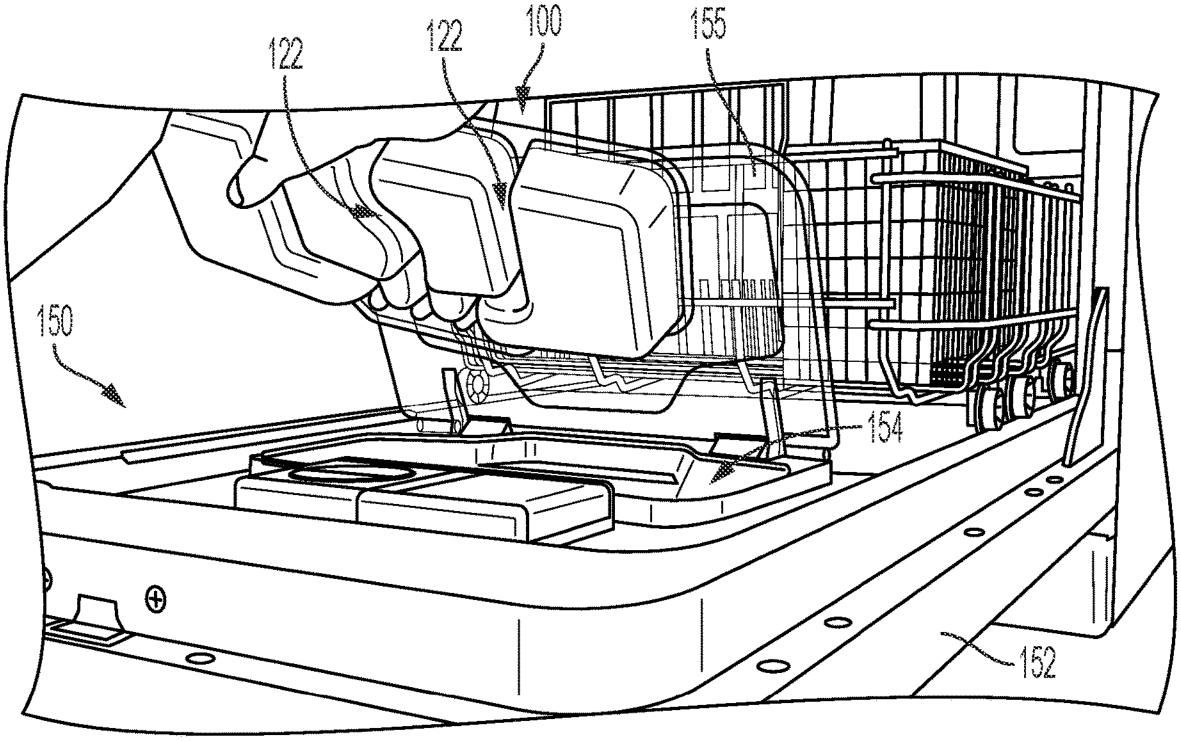
FIG. 13 is a perspective view is of a partitioned solution cartridge being positioned within a storage receptacle, according to the present disclosure.
Figure 14:
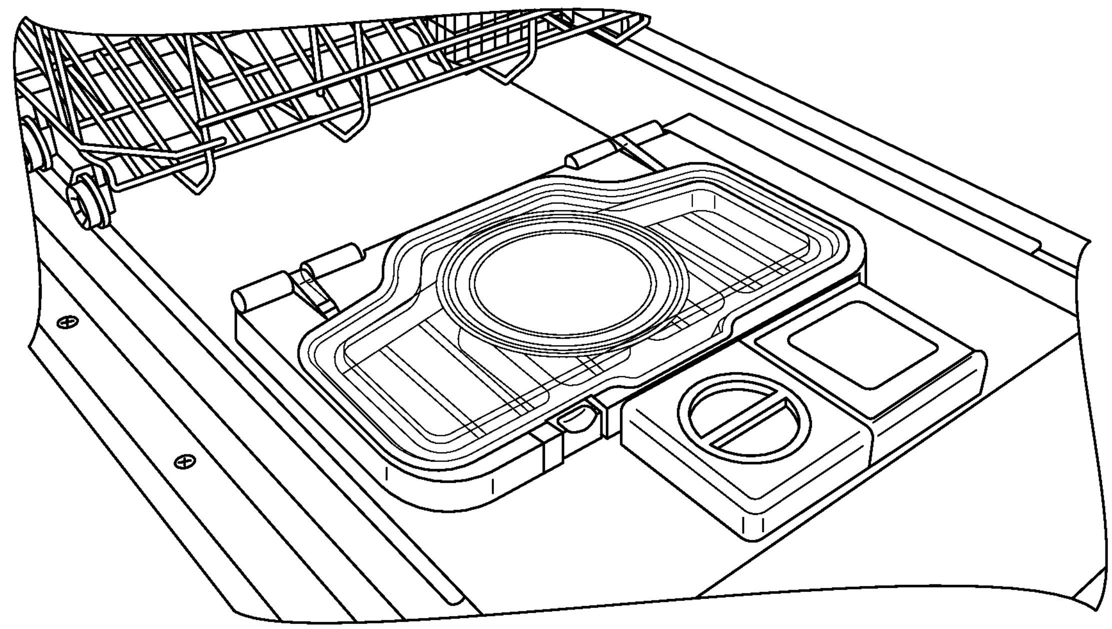
FIG. 14 is a perspective view is of a partitioned solution cartridge positioned within a storage receptacle, according to the present disclosure.

One or more of the plurality of contained solution sectors 110 may include an air vent 134. Each of the plurality of contained solution sectors 110 may include an air vent 134. It is contemplated that at least some of the plurality of contained solution sectors 110 may share an air vent 134 (not shown). The air vent 134 may be positioned on the protective top film 102 at least partially enclosing the fluid reservoir 112. In embodiments, the air vent 134 is positioned proximate the top end 130 of the fluid reservoir 112. The air vent 134 may be positioned on the protective top film 102 proximate the top end 130 of the fluid reservoir 112 in an area spanning 10% of the overall length L. In embodiments, 10% of the overall length L may be from 0.2 to 2 cm, from 0.2 to 1.75 cm, from 0.2 to 1.5 cm, from 0.2 to 1.25 cm, from 0.2 to 1 cm, from 0.2 to 0.75 cm, from 0.2 to 0.5 cm, from 0.5 to 2 cm, from 0.5 to 1.75 cm, from 0.5 to 1.5 cm, from 0.5 to 1.25 cm, from 0.5 to 1 cm, from 0.5 to 0.75 cm, from 0.75 to 2 cm, from 0.75 to 1.75 cm, from 0.75 to 1.5 cm, from 0.75 to 1.25 cm, from 0.75 to 1 cm, from 1 to 2 cm, from 1 to 1.75 cm, from 1 to 1.5 cm, from 1 to 1.25 cm, from 1.25 to 2 cm, from 1.25 to 1.75 cm, from 1.25 to 1.5 cm, from 1.5 to 2 cm, from 1.5 to 1.75 cm, from 1.75 to 2 cm, or any values within the foregoing ranges or any ranges created thereby. It is contemplated that the air vent 134 may be positioned vertically above a fluid level of the fluid 111 within the fluid reservoir 112 when the partitioned solution cartridge 100 is positioned in a substantially vertical orientation, as shown in FIG. 10, as will be subsequently described. The air vent 134 allows air into the fluid reservoir to compensate for the fluid 111 volume being dispensed from the distribution chamber 114 to prevent deformation or collapse of the partitioned solution cartridge 100 in use. Additionally or alternatively, the air vent 134 may equilibrate the pressure in the partitioned solution cartridge 100 with the pressure in the automatic dishwashing machine 150 to prevent expansion, permanent deformation, or both of the partitioned solution cartridge 100 at elevated temperatures throughout the washing cycles. It is contemplated that there may be a second air vent (not shown) in the storage receptacle 154 (thereby allowing air flow access to the air vent 134 within the storage receptacle 154) that may be shielded against wash water or have a one way valve to prevent ingress of wash water into the partitioned solution cartridge 100. The air vent 134 may be pierced when the partitioned solution cartridge 100 is inserted into the storage receptacle 154 so that no leakage can happen throughout the manufacturing and supply chain process or in consumer handling. Alternative venting is possible with build in one-way valves into the cartridge or even via the pumping engine pumping air in while dispensing the fluid.

Figure 9:
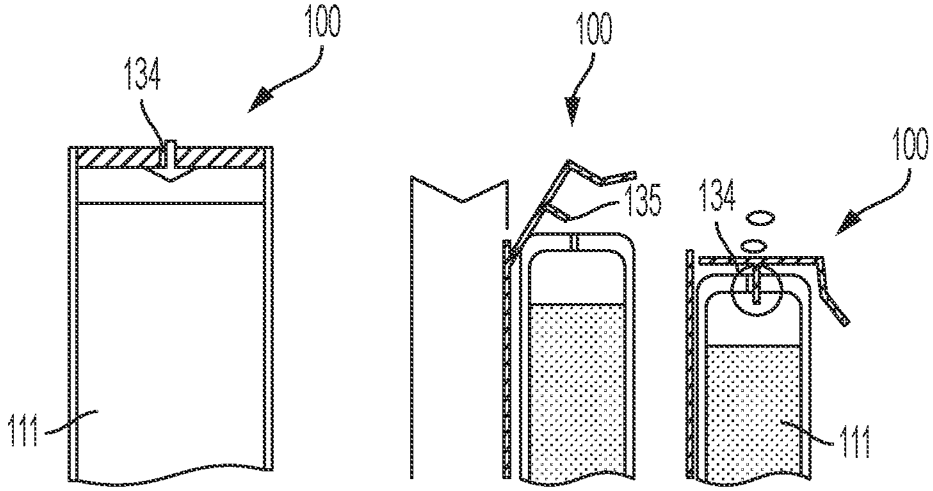
FIG. 9 is a schematic of a partitioned solution cartridge having an air vent positioned on the top of the partitioned solution cartridge when the cartridge is vertically oriented, according to the present disclosure.

In embodiments, the air vent 134 may be pierced in the protective top film 102 in the zone on the top flange of the partitioned solution cartridge 100 and having a small channel molded in the flange underneath the piercing zone, as shown in FIG. 9. This will allow a more controlled piercing of the protective top film 102 since the zone around it will be heat sealed and kept in place and it will minimize risk of leakage since the air vent 134 is at the highest point in the vertical position.

Referring to FIGS. 1-3, 6, 7, and 11, the compartmentalized body 104 may further include a display aperture 136. The display aperture 136 may be positioned between the plurality of contained solution sectors 110 and the lower end 105 of the compartmentalized body 104. The display aperture 136 may be positioned from 0.3 to 3 cm, from 0.3 to 2.5 cm, from 0.3 to 2 cm, from 0.3 to 1.5 cm, from 0.3 to 1 cm, from 0.3 to 0.5 cm, from 0.5 to 3 cm, from 0.5 to 2.5 cm, from 0.5 to 2 cm, from 0.5 to 1.5 cm, from 0.5 to 1 cm, from 1 to 3 cm, from 1 to 2.5 cm, from 1 to 2 cm, from 1 to 1.5 cm, from 1.5 to 3 cm, from 1.5 to 2.5 cm, from 1.5 to 2 cm, from 2 to 3 cm, from 2 to 2.5 cm, from 2.5 to 3 cm, or any values within the foregoing ranges or any ranges created thereby from the lower end 105 of the compartmentalized body 104. This position ensures sufficient rigidity to hang the partitioned solution cartridge 100 by the display aperture 136.

Use in an Automatic Dishwashing Machine

When the partitioned solution cartridge 100 is positioned in a substantially vertical orientation, for each of the plurality of contained solution sectors 110 the fluid reservoir 112 is positioned vertically above the distribution chamber 114 such that fluid 111 from the fluid reservoir 112 flows via gravity draining to the distribution chamber 114.

Figure 4:
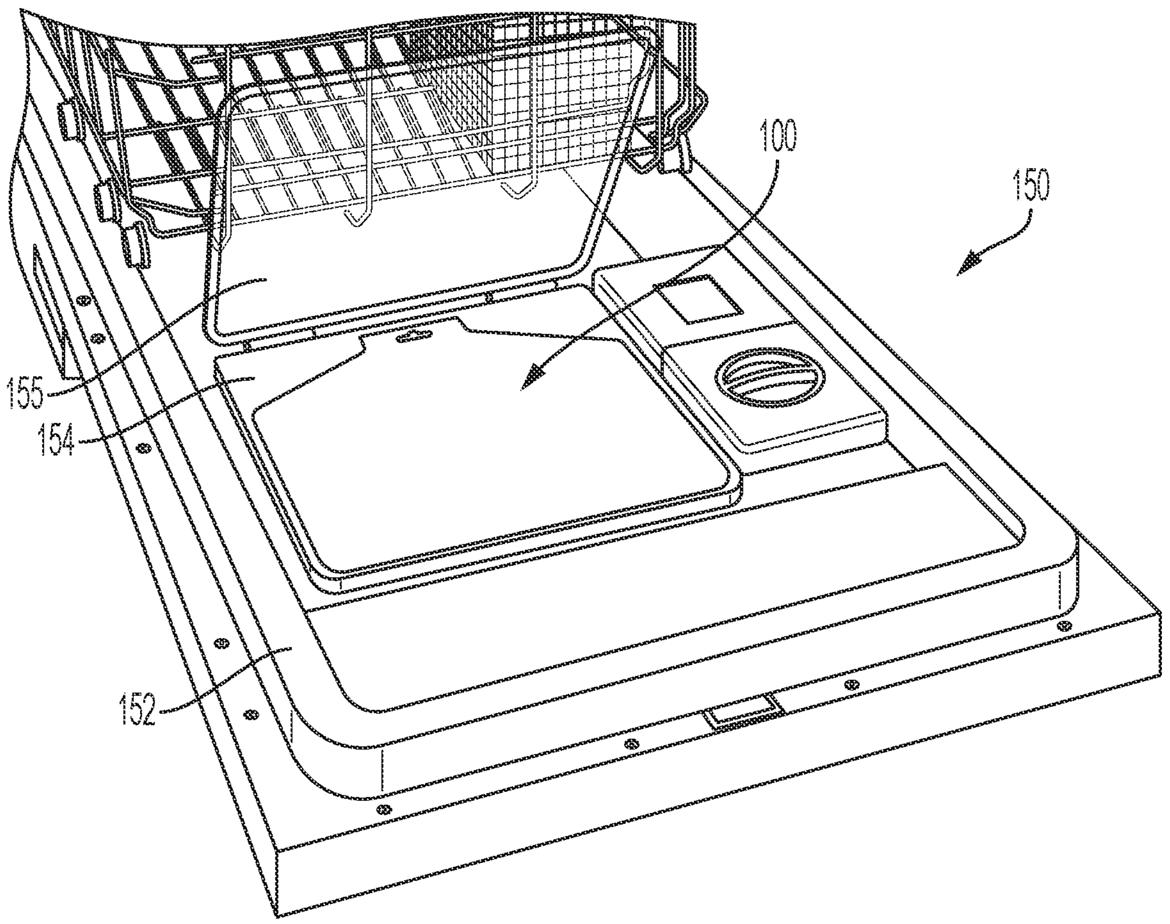
FIG. 4 is a perspective view of a partitioned solution cartridge positioned within an automatic dishwashing machine, according to the present disclosure.
Figure 5:
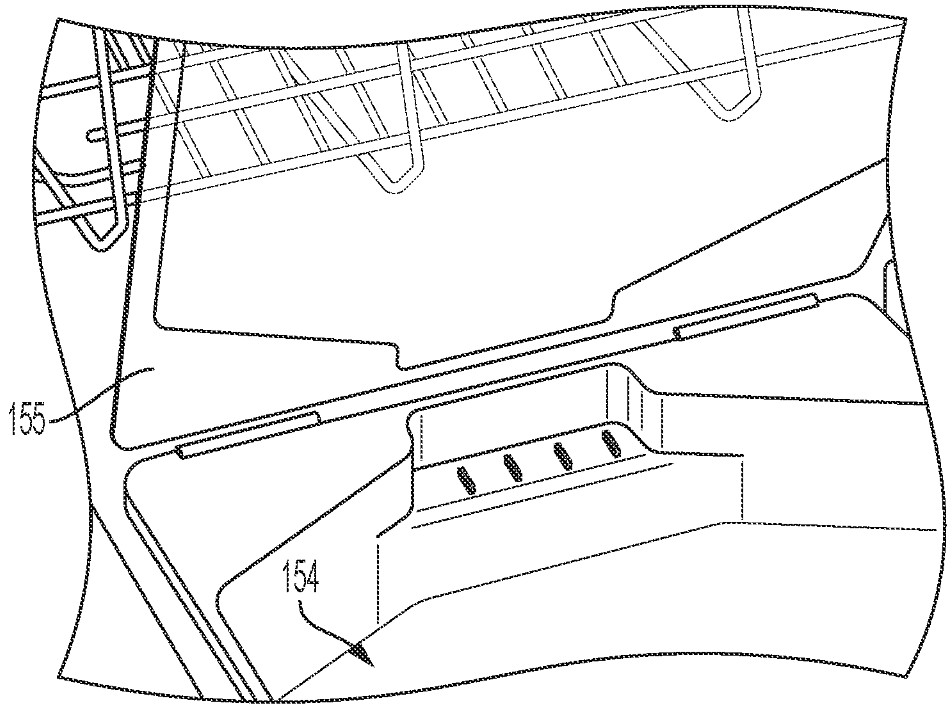
FIG. 5 is a perspective view of a storage receptacle for placement of a partitioned solution cartridge, according to the present disclosure.

Referring now to FIGS. 4 and 10 and 12-14, the partitioned solution cartridge 100 may be placed within a door 152 of an automatic dishwashing machine 150, as shown. The partitioned solution cartridge 100 may be in the substantially vertical orientation (shown in FIG. 10) when positioned in a storage receptacle 154 within the door 152 of the automatic dishwashing machine 150 when the door 152 is closed. In embodiments, the storage receptacle 154 may include a containment plate 155, as shown in FIGS. 4, 5, and 8, that closes over the storage receptacle 154 to ensure the partitioned solution cartridge 100 is contained within the storage receptacle 154 when the door 152 is closed and the partitioned solution cartridge 100 is in the substantially vertical orientation.

Figure 8:
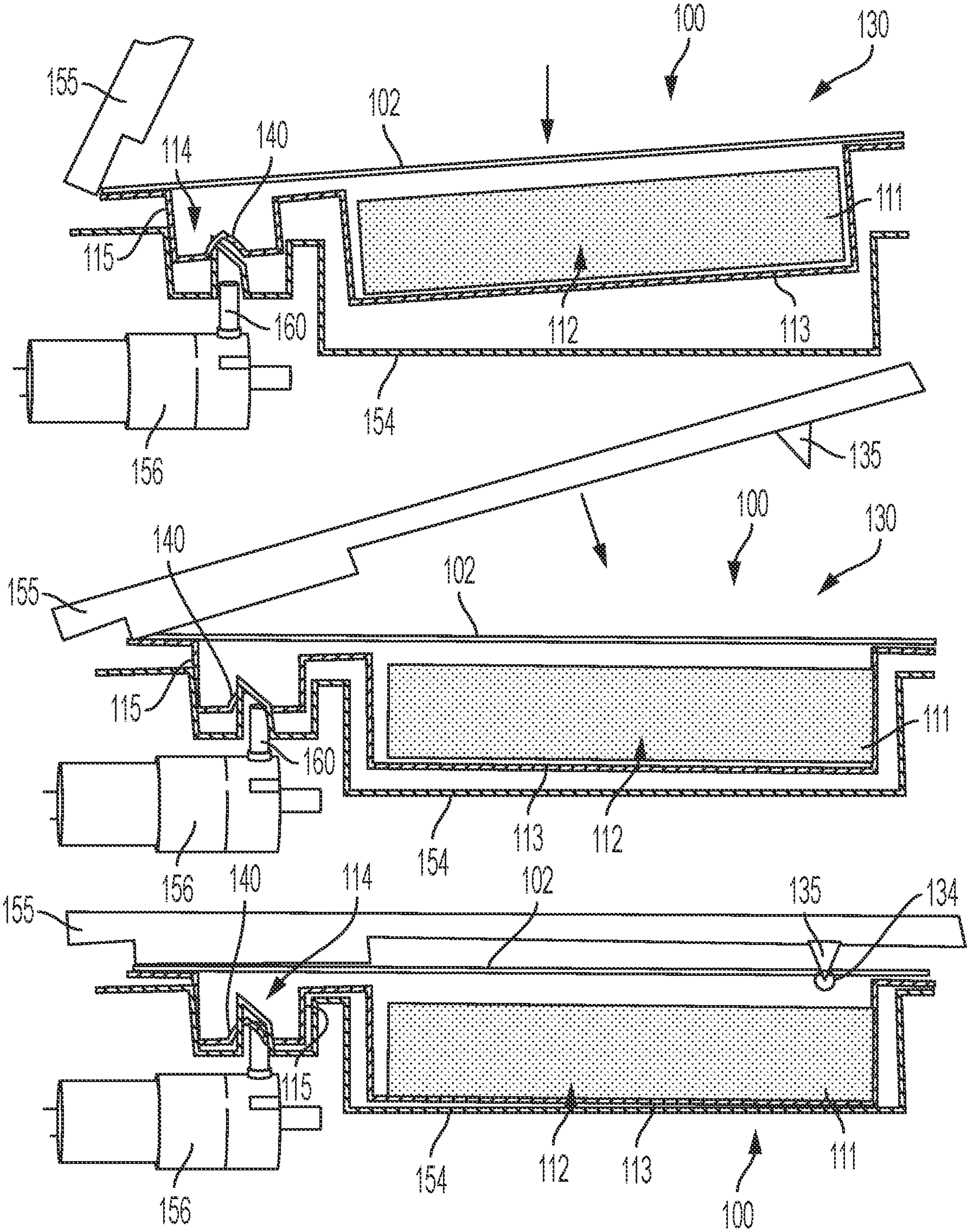
FIG. 8 is a schematic of a partitioned solution cartridge being positioned within a storage receptacle, according to the present disclosure.

In embodiments, the containment plate 155 may include a puncturing rod 135 that punctures the protective top film 102 to form the air vent 134 when the containment plate 155 closes over the partitioned solution cartridge 100, as shown in FIG. 8.

During the course of a selected dishwashing program a domestic dishwasher generally performs one or more cycles, such as a pre-wash, main-wash, intermediate rinse cycle, final rinse cycle and then a drying cycle to terminate the program. During the respective cycles, fluid 111 is distributed, in particular sprayed, by means of a rotating spray arm, a fixed spray nozzle, for example a top spray head, a movable spray nozzle, for example a top spinning unit, and/or some other liquid distribution apparatus, in the treatment chamber of the dishwasher cavity, in which fluid 111 is applied to items to be washed, such as dishes and/or cutlery, to be cleaned, which are supported in and/or on at least one loading unit, for example a pull-out rack or a cutlery drawer that can preferably be removed or pulled out. To this end the automatic dishwashing machine 150 is preferably supplied with fluid 111 by way of at least one supply line by an operating circulating pump 156, said fluid 111 collecting at the bottom of the dishwasher cavity, preferably in a depression, in particular in a sump. If the fluid 111 must be heated during the respective liquid-conducting washing sub-cycle, the fluid 111 is heated by means of a heating facility. This can be part of the operating circulating pump 156. At the end of the respective liquid-conducting washing sub-cycle some or all of the fluid 111 present in the treatment chamber of the dishwasher cavity in each instance is pumped out by means of a drain pump.

Referring still to FIGS. 4-6 and 8, it is contemplated that the storage receptacle 154 can be located inside or outside of the automatic dishwashing machine 150. If placed inside of the automatic dishwashing machine 150, the storage receptacle 154 can be integrated into the automatic dishwasher (i.e., a storage receptacle 154 permanently fixed (built in) to the automatic dishwashing machine 150), and can also be an autarkic (i.e., an independent storage receptacle 154 that can be inserted into the interior of the automatic dishwashing machine 150).

An example of an integrated storage receptacle 154 is a receptacle built into the door 152 of the automatic dishwashing machine 150 and connected to the interior of the automatic dishwashing machine 150 by a supply line.

A dosing device can be for example an automated unit comprising the storage receptacle 154 and a dispensing unit capable of releasing a controlled amount of different compositions at different times, for example to the pre-wash and to the main-wash. Different types of hardware might be part of the dosing device for controlling the dispensing of the fluid 111, or for communicating with external devices such as data processing units, the automatic dishwashing machine 150 or a mobile device or server that a user can operate.

The dosing device can be linked to sensors that can determine, based on sensor's input, the amount of fluid required. Sensors that may be used include pH, turbidity, temperature, humidity, conductivity, etc. The dishwasher may require data processing power to achieve this. It is preferred that the dishwashing will have connectivity to other devices. This may take the form of wi-fi, mobile data, blue tooth, etc. This may allow the dishwasher to be monitored and/or controlled remotely. Preferably, this also allows the machine to connect with the internet.

The storage receptacle 154 may have a volume of from 0.1 to 5 l, from 0.1 to 3 l, from 0.1 to 2 l, from 0.1 to 1 l, from 0.1 to 0.5 l, from 0.5 to 5 l, from 0.5 to 3 l, from 0.5 to 2 l, from 0.5 to 1 l, from 1 to 5 l, from 1 to 3 l, from 1 to 2 l, from 2 to 5l, from 2 to 3 l, from 3 to 5 l, or any values within the foregoing ranges or any ranges created thereby.

Figure 6:
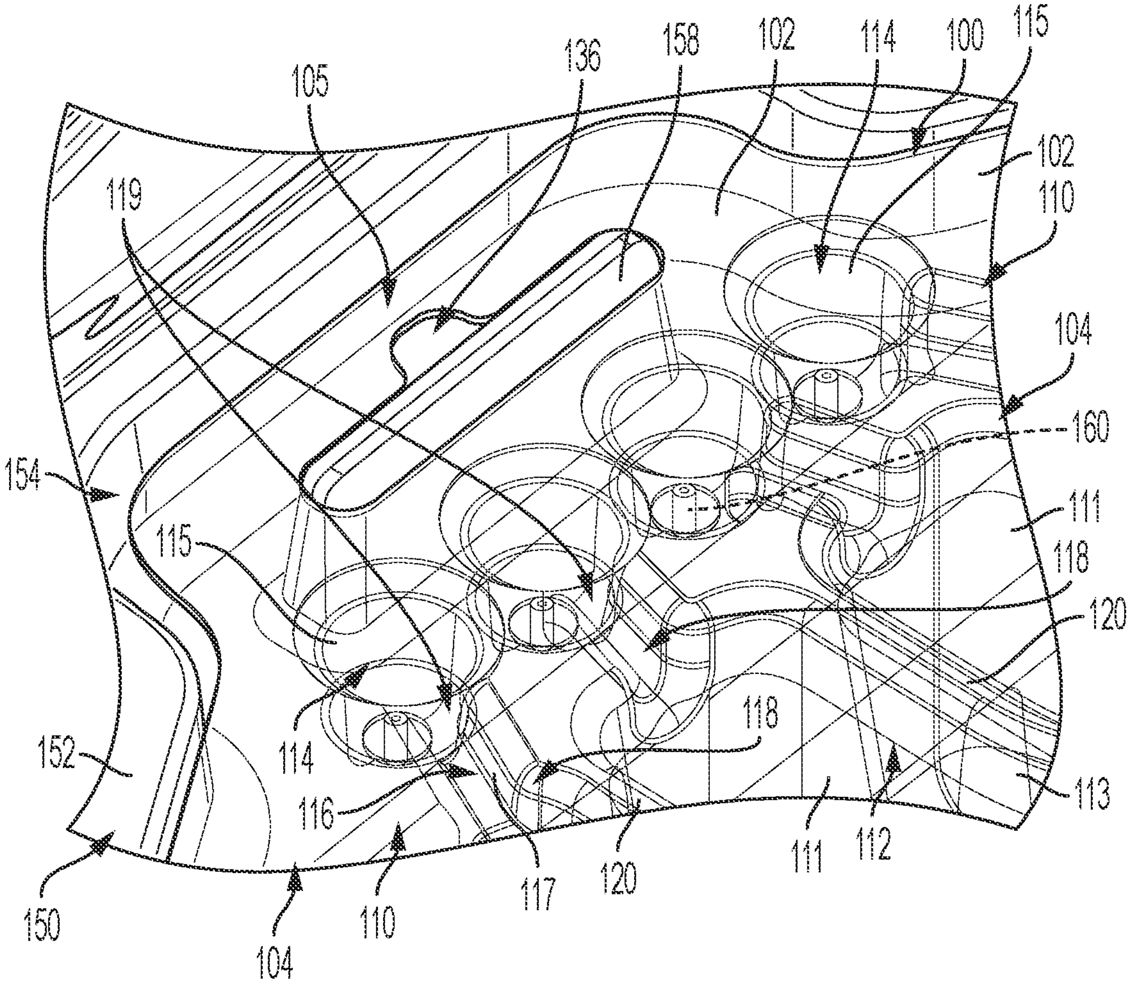
FIG. 6 is a perspective view of a partitioned solution cartridge positioned within a storage receptacle, according to the present disclosure.
Figure 7:
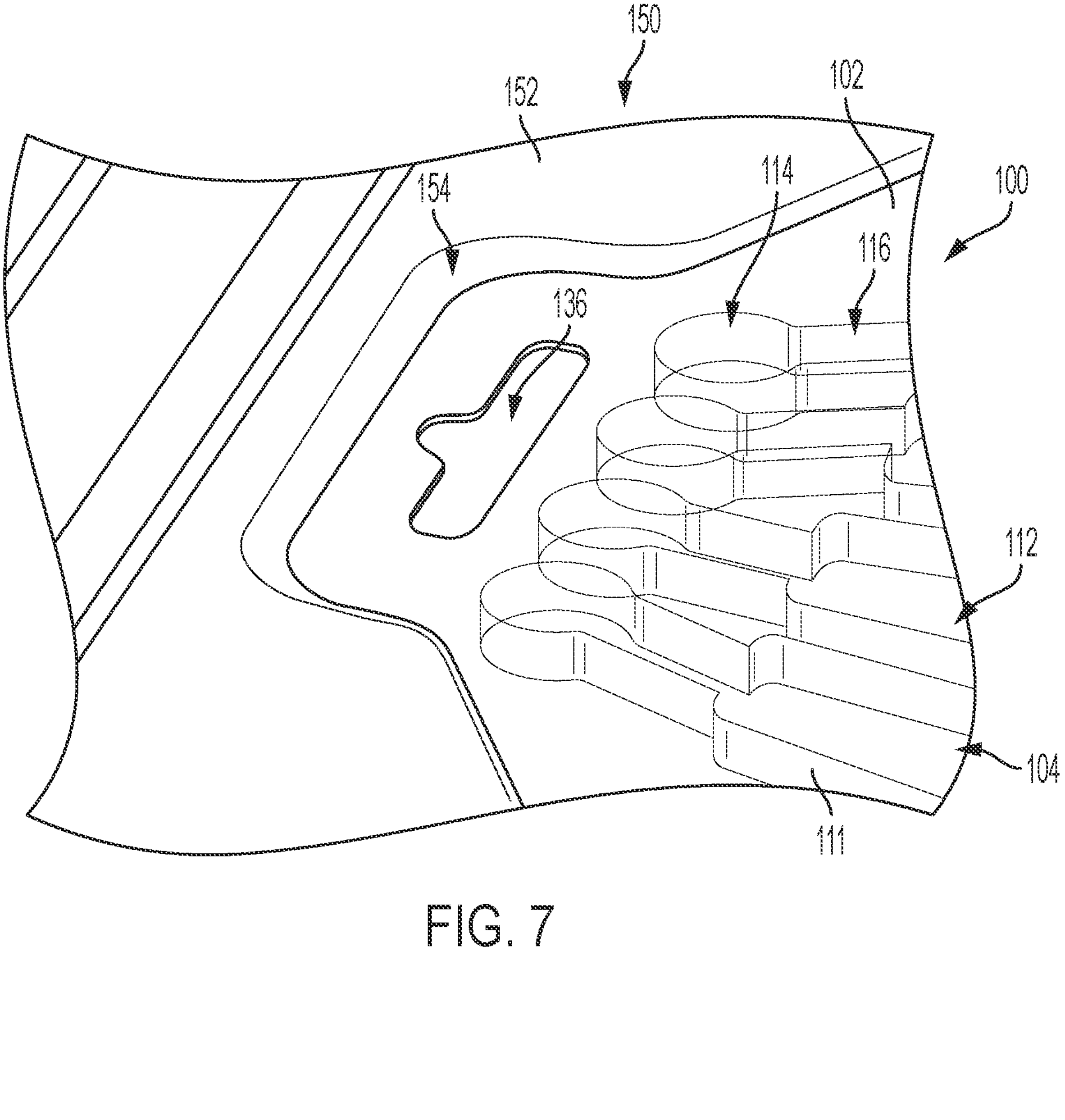
FIG. 7 is a perspective view of a partitioned solution cartridge positioned within a storage receptacle, according to the present disclosure.

The storage receptacle 154 may have an aperture engagement feature 158, as shown in FIG. 6. The aperture engagement feature 158 may be any shape suitable to mate with the display aperture 136 of the partitioned solution cartridge 100 to secure the partitioned solution cartridge 100 within the storage receptacle 154 when the consumer places it within the storage receptacle 154.

Referring still to FIGS. 4-6 and 8, when the partitioned solution cartridge 100 is in the substantially vertical orientation when positioned within the door 152 of the automatic dishwashing machine 150, a seal may be formed between the distribution chamber 114 and the automatic dishwashing machine 150. As previously described, the exterior cylindrical shape of the distribution chamber 114 helps to seal the partitioned solution cartridge 100 connection to the storage receptacle 154 liquid tight with an o-ring or other circular seal in the receiver. The distribution chamber 114 may be pierced by a piercing means 160 that is an integral member of the automatic dishwashing machine 150, as shown in FIG. 6. The distribution chamber 114 may be pierced when the partitioned solution cartridge 100 is in the substantially vertical orientation when positioned within the door 152 of the automatic dishwashing machine 150 when the door 152 is closed. It is contemplated that the partitioned solution cartridge 100 may be placed within the automatic dishwashing machine 114 by first orienting the partitioned solution cartridge 100 into the storage receptacle 154 via the matching shape of the display aperture 136 and aperture engagement feature 158, then make a liquid tight seal around the outside of the distribution chamber 114 and then pierce concave notch 140 of the distribution chamber 114 to prevent any leakage, spillage, misalignment, or combinations thereof during piercing. The containment plate 155 on the storage receptacle 154 can help to do this in a controlled way and provides some leverage to enable the piercing. A hinge of the containment plate 155 on the storage receptacle 154 may be close to the lower end 105 of the partitioned solution cartridge 100 to maximize the lever force.

The distribution chamber 114 may include a connection means that enables the distribution chamber 114 to connect to a connection means that is integral to the automatic dishwashing machine 150. The connection means may include a piercing means 160. In embodiments, the piercing means 160 may be a static hollow needle that punctures the distribution chamber 114, a movable hollow needle that is pressed upwards while closing the door 152, the containment plate 155, or both. The piercing means 160 may be linked to electronically steered pumps in the automatic dishwashing machine 150 that dispenses, injects, or both, a specific amount of fluid 111 at specific points of the wash cycle defined by a dispensing algorithm. The algorithm can define the correct chemistry to be dosed based on machine type, load size, load type (glass, plastic, tableware, cutlery, pots, pans, or combinations thereof), degree of soil, type of soil, wash cycle chosen (short, long, eco, high temperature, low temperature, or combinations thereof), or combinations thereof. The piercing means 160 may include some soft deformable material around it to prevent consumers from accessing the sharp tip, or a spring-loaded protector around the piercing means 160 that is moved down while inserting the partitioned solution cartridge 100.

The connection means may further include sealing rings such as rubber o-ring or other sealing elements (deformable sealing rib/flanges or the like) to make a leak tight connection with the storage receptacle 154. The seal may be watertight, to insulate and protect the partitioned solution cartridge 100 inside the storage receptacle 154 from the cleaning water, the dirt and high temperature, high humidity, or combinations thereof inside of the automatic dishwashing machine 150.

The connection means may be positioned proximate the lowest point of the partitioned solution cartridge 100 when the partitioned solution cartridge 100 is vertically positioned in the closed door to make sure there is always fluid 111 fed to the pump until the partitioned solution cartridge 100 is empty, i.e. to avoid that the pump runs dry or pumps some air.

In embodiments, each of the connection means may be spaced apart at a distance of from 0.3 to 10 cm, from 0.3 to 8 cm, from 0.3 to 6 cm, from 0.3 to 4 cm, from 0.3 to 2 cm, from 0.3 to 1 cm, from 1 to 10 cm, from 1 to 8 cm, from 1 to 6 cm, from 1 to 4 cm, from 1 to 2 cm, from 2 to 10 cm, from 2 to 8 cm, from 2 to 6 cm, from 2 to 4 cm, from 4 to 10 cm, from 4 to 8 cm, from 4 to 6 cm, from 6 to 10 cm, from 6 to 8 cm, from 8 to 10 cm, or any values within the foregoing ranges or any ranges created thereby. The connection means may be each substantially equally spaced from each other. In embodiments, the connection means may be equally spaced apart in a straight line as shown in FIGS. 5 and 6. Additionally or alternatively, the connection means may be spaced apart in a pattern that is not a straight line. The amount of connection means may directly correlate to the amount of distribution chambers 114 present in the partitioned solution cartridge 100, which directly correlates to the amount of contained solution sectors 110. Therefore, the amount of connection means may be any of the amounts of contained solution sectors 110 previously described.

In embodiments, the partitioned solution cartridge 100 may include any suitable "smart" means known in the art to identify the partitioned solution cartridge 100 and its content that can be recognized, read by the automatic dishwashing machine 150, or both to link the partitioned solution cartridge 100 to the machine algorithm. The smart means may include an RFID tag, NFC tag, readable 2D or 3D barcodes, microchips, "holygrail" invisible barcodes, or combinations thereof. These can also be used to monitor production dates, production locations, the number of uses, the volumes of fluid 111 dispensed, different chemistries dispensed, send a warning when the partitioned solution cartridge 100 is nearly empty of fluid 111, or even automatically order a new partitioned solution cartridge 100 when the partitioned solution cartridge 100 is nearly empty of fluid 111, or combinations thereof. It can also be set-up to have two way communication with apps on a smartphone or on an interactive consumer display of the automatic dishwashing machine 150.

Fluid Compositions

As previously described, the plurality of contained solution sectors 110 may include fluid 111, which may include an automatic dishwashing detergent composition. As previously described, each of the plurality of contained solution sectors 110 may include chemically distinct fluids 111. Any of the fluids 111 present in any of the plurality of contained solution sectors 110 may include any of the chemical components described below. As described below, weight percentages and amounts are used to describe the overall amount of chemicals present in the composition. For the purposes of this disclosure, the "composition" refers to the a composition including the total amount of fluid present in the plurality of contained solution sectors 110. Specifically, the "composition" refers to the composition formed if each of the individual fluids present in each of the plurality of contained solution sectors 110 were combined.

Surfactant

In embodiments, the fluid may include a surfactant. The surfactant may include a detersive surfactant, such as a non-ionic detersive surfactant. The fluid may include a ternary mixture of non-ionic surfactant. Compositions comprising this mixture have been found to exhibit good grease suspension, even at low temperatures, and drying properties especially on items treated in a dishwashing operation.

The compositions may comprise a ternary surfactant mixture comprising; a) a non-ionic surfactant having a cloud point of 50° C. or above (herein referred to as "high cloud point non-ionic surfactant"), and b) a non-ionic surfactant having a cloud point below 50° C. (herein referred to as "low cloud point non-ionic surfactant"), wherein the weight ratio of a) to b) is preferably in the range of from 2:1 to 1:2. The ternary surfactant mixture may further comprises an ethylene oxide-propylene oxide triblock copolymer having a cloud point below 50° C., preferably below 40° C.

The cloud point is the temperature at which a non-ionic surfactant solution phase separates into a water rich and surfactant rich phase and becomes cloudy. The cloud point temperature can be determined visually by identifying at which temperature cloudiness occurs.

The cloud point temperature of a non-ionic surfactant can be determined as follows: a solution containing 1% of the corresponding non-ionic surfactant by weight of the solution is prepared in distilled water. The solution is stirred gently before analysis to ensure that the process occurs in chemical equilibrium. The cloud point temperature is taken in a thermostatic bath by immersing the surfactant solution in a 75 mm sealed glass test tube. To ensure the absence of leakage, the test tube is weighed before and after the cloud point temperature measurement. The temperature is gradually increased at a rate of less than 1° C. per minute, until the temperature reaches a few degrees below the pre-estimated cloud point. The cloud point temperature is determined visually at the first sign of turbidity.

It is preferred that the cloud point of the high cloud point non-ionic surfactant is in the range of from 55° C. to 85° C., more preferably 60° C. to 80° C. It is preferred that the cloud point of the low cloud point non-ionic surfactant is in the range of from 5° C. to 45° C., more preferably 8° C. to 35° C.

According to the present disclosure it is most preferred that the high cloud point nonionic surfactant has a cloud point in the range of from 60° C. to 80° C. and the low cloud point nonionic surfactant has a cloud point in the range of from 8° C. to 35° C. Particularly good results have been achieved according to the disclosure by compositions comprising a non-ionic surfactant mixture, wherein the high cloud point non-ionic surfactant is an alkoxylated non-ionic surfactant having a single alkoxylate type, and the low cloud point non-ionic surfactant is an alkoxylated non-ionic surfactant having at least two alkoxylate types.

The alkoxylated non-ionic surfactants of high cloud point may be prepared by the reaction of a monohydroxy alkanol or alkylphenol with 6 to 22 carbon atoms, preferably 8 to 20 carbon atoms, most preferably 10 to 18 carbon atoms. It is preferred that the type of alkoxylate surfactant is ethoxylate, butoxylate or propoxylate with ethoxylate being especially preferred. Preferably the high cloud point surfactants have 3 to 20 moles, particularly preferred 4 to 10 moles, and still more preferred 5 to 8 moles of alkylene oxide, particularly ethylene oxide, per mole of alcohol or alkylphenol. A particularly preferred high cloud point non-ionic surfactant is C10-C15 with 5-10 EO, more preferably C13 with 7EO. The high cloud point non-ionic surfactants may be prepared from either branched or linear chain fatty alcohols of the above types. Preferred examples of high cloud point nonionic surfactants are Lutensol TO7 (BASF), Marlipal O13/70 (Sasol), Imbentin-T/070 (Kolb), Emuldac AS-11 (Sasol) and Emuldac AS-20 (Sasol).

The alkoxylated non-ionic surfactants of low cloud point may be prepared by the reaction of a monohydroxy alkanol or alkylphenol with 4 to 25 carbon atoms, preferably 6 to 20 carbon atoms, most preferably 8 to 14 carbon atoms. It is preferred that the low cloud point surfactant has 2 to 45 moles in total of alkylene oxide per mole of surfactant. It is preferred that the type of alkoxylates in low cloud point surfactant is a mixture of at least two of ethoxylate, butoxylate and/or propoxylate, with a mixture of ethoxylate and propoxylate being especially preferred. Preferably the low cloud point surfactants have 2 to 25 moles, especially 5 to 20 moles of ethylene oxide per mole of alcohol or alkylphenol and 2 to 40 moles, more preferably 5 to 30 moles of propylene oxide per mole of alcohol or alkylphenol. A mixture of butylene oxide or propylene oxide is also possible. A particularly preferred low cloud point surfactant is C10-C12 with 10-20 EO and 10-20 PO. The low cloud point non-ionic surfactants may be prepared from either branched or linear chain fatty alcohols of the above types.

Low cloud point surfactants may also include surfactants which are ethoxylated and butoxylated mono-hydroxy alkanols or alkylphenols, which additionally comprises polyoxyethylene-polyoxypropylene block copolymer units. The alcohol or alkylphenol portion of such surfactants constitutes more than 30%, preferably more than 50%, more preferably more than 70% by weight of the overall molecular weight of the non-ionic surfactant. Preferred examples of low cloud point non-ionic surfactants are Plurafac SLF-180 (BASF) and Ecosurf LFE-1410 (Dow). The low cloud point surfactant is typically more hydrophobic than the high cloud point surfactant and the amounts and types of the two surfactants in the claimed mixture are preferably selected such that the foaming characteristics of the composition are controlled to within the desired range. For automatic dishwashing applications it is usual to desire low-foaming characteristics It is especially preferred according to the present disclosure that the high cloud point non-ionic surfactant is an ethoxylated non-ionic surfactant and the low cloud point non-ionic surfactant is a mixed propoxylated-ethoxylated-propoxylated non-ionic surfactant. The weight ratio of high cloud point to low cloud point non-ionic surfactant is preferably in the range 2:1 to 1:2, more preferably 1.5:1 to 1:1.5.

Polymer

In embodiments, the fluid may include a polymer. The polymer may include a soil release polymer. The polymer may be present in any suitable amount from about 0.1% to about 30%, preferably from 0.5% to about 20%, more preferably from 1% to 15% by weight of the composition. Sulfonated/carboxylated polymers are particularly suitable for the composition.

Suitable sulfonated/carboxylated polymers described herein may have a weight average molecular weight of less than or equal to about 100,000 Da, or less than or equal to about 75,000 Da, or less than or equal to about 50,000 Da, or from about 3,000 Da to about 50,000, preferably from about 5,000 Da to about 45,000 Da.

Preferred sulfonated monomers include one or more of the following: 1-acrylamido-1-propanesulfonic acid, 2-acrylamido-2-propanesulfonic acid, 2-acrylamido-2-methyl-1-propanesulfonic acid, 2-methacrylamido-2-methyl-1-propanesulfonic acid, 3-methacrylamido-2-hydroxy-propanesulfonic acid, allylsulfonic acid, methallylsulfonic acid, allyloxybenzenesulfonic acid, methallyloxybenzenesulfonic acid, 2-hydroxy-3-(2-propenyloxy) propanesulfonic acid, 2-methyl-2-propen-1-sulfonic acid, styrenesulfonic acid, vinylsulfonic acid, 3-sulfopropyl, 3-sulfo-propylmethacrylate, sulfomethacrylamide, sulfomethylmethacrylamide and mixtures of said acids or their water-soluble salts.

Preferably, the polymer comprises the following levels of monomers: from about 40 to about 90%, preferably from about 60 to about 90% by weight of the polymer of one or more carboxylic acid monomer; from about 5 to about 50%, preferably from about 10 to about 40% by weight of the polymer of one or more sulfonic acid monomer; and optionally from about 1% to about 30%, preferably from about 2 to about 20% by weight of the polymer of one or more non-ionic monomer. An especially preferred polymer comprises about 70% to about 80% by weight of the polymer of at least one carboxylic acid monomer and from about 20% to about 30% by weight of the polymer of at least one sulfonic acid monomer.

In the polymers, all or some of the carboxylic or sulfonic acid groups can be present in neutralized form, i.e. the acidic hydrogen atom of the carboxylic and/or sulfonic acid group in some or all acid groups can be replaced with metal ions, preferably alkali metal ions and in particular with sodium ions.

The carboxylic acid is preferably (meth)acrylic acid. The sulfonic acid monomer is preferably 2-acrylamido-2-propanesulfonic acid (AMPS).

Preferred commercial available polymers include: Alcosperse 240 and Aquatreat AR 540 supplied by Nouryon; Acumer 3100, Acumer 2000, Acusol 587G and Acusol 588G supplied by Dow. Particularly preferred polymers are Acusol 587G and Acusol 588G supplied by Dow.

Suitable polymers include anionic carboxylic polymer of low molecular weight. They can be homopolymers or copolymers with a weight average molecular weight of less than or equal to about 200,000 g/mol, or less than or equal to about 75,000 g/mol, or less than or equal to about 50,000 g/mol, or from about 3,000 to about 50,000 g/mol, preferably from about 5,000 to about 45,000 g/mol. The dispersant polymer may be a low molecular weight homopolymer of polyacrylate, with an average molecular weight of from 1,000 to 20,000, particularly from 2,000 to 10,000, and particularly preferably from 3,000 to 5,000.

The polymer may be a copolymer of acrylic with methacrylic acid, acrylic and/or methacrylic with maleic acid, and acrylic and/or methacrylic with fumaric acid, with a molecular weight of less than 70,000. Their molecular weight ranges from 2,000 to 80,000 and more preferably from 20,000 to 50,000 and in particular 30,000 to 40,000 g/mol. and a ratio of (meth)acrylate to maleate or fumarate segments of from 30:1 to 1:2.

The polymer may be a copolymer of acrylamide and acrylate having a molecular weight of from 3,000 to 100,000, alternatively from 4,000 to 20,000, and an acrylamide content of less than 50%, alternatively less than 20%, by weight of the dispersant polymer can also be used. Alternatively, such polymer may have a molecular weight of from 4,000 to 20,000 and an acrylamide content of from 0% to 15%, by weight of the polymer.

Polymers suitable herein also include itaconic acid homopolymers and copolymers.

Alternatively, the polymer can be selected from the group consisting of alkoxylated polyalkyleneimines, alkoxylated polycarboxylates, polyethylene glycols, styrene co-polymers, cellulose sulfate esters, carboxylated polysaccharides, amphiphilic graft copolymers and mixtures thereof.

The polymer may include ethylene oxide-propylene oxide block copolymer. The ethylene oxide-propylene oxide block copolymer is a triblock copolymer and can have one of the following structures:

$$EOx1POy1EOx2 \quad \text{Formula (I)}$$

$$POy2EOx3POy3 \quad \text{Formula (II)}$$

wherein each of x1, x2 and x3 is in the range of from about 1 to about 50 and each of y1, y2 and y3 is in the range of from about 10 to about 70.

The ethylene oxide-propylene oxide-ethylene oxide triblock copolymer of Formula I preferably has an average propylene oxide chain length of between 10 and 70, preferably between 20 and 60, more preferably between 25 and 55 propylene oxide units.

The ethylene oxide-propylene oxide-ethylene oxide triblock copolymer of Formula II preferably has an average ethylene oxide chain length of between 1 and 50, preferably between 2 and 40, more preferably between 3 and 30 ethylene oxide units.

The ethylene oxide-propylene oxide triblock copolymer of Formula I and Formula II have a cloud point lower than 50° C., preferably lower than 40° C.

Preferably, the ethylene oxide-propylene oxide triblock copolymers of Formula I and Formula II have a weight average molecular weight of between about 1000 and about 10,000 Daltons, preferably between about 1200 and about 8000 Daltons, more preferably between about 1500 and about 7000 Daltons, even more preferably between about 1750 and about 5000 Daltons, most preferably between about 2000 and about 4000 Daltons.

Suitable ethylene oxide-propylene oxide triblock copolymers are commercially available under the Pluronic PE and Pluronic RPE series from the BASF company, or under the Tergitol L series from the Dow Chemical Company. Particularly suitable materials are Pluronic PE 9200, Tergitol L81, Tergitol L62, Tergitol L61, Pluronic RPE 3110 and Pluronic RPE 2520.

In embodiments, the fluid may be a phosphate-free cleaning composition. The fluid may be free of anionic and cationic surfactants.

The fluid may have a pH as measured in 1% weight aqueous solution in distilled water at 20° C. of at least 10, more preferably at least 10.5. A pH of at least 10 or at least 10.5 is preferable for use as a cleaning composition.

The fluid may include a complexing agent, a dispersant polymer, bleach, inorganic builder (preferably carbonate and/or silicate), enzymes, in particular protease and amylase enzymes, glass care agents, metal care agents, etc.

Complexing Agent

Complexing agents are materials capable of sequestering hardness ions, particularly calcium and/or magnesium.

The fluid may include a complexing agent selected from the group consisting of methylglycine-N,N-diacetic acid (MGDA), glutamic acid-N,N-diacetic acid (GLDA), iminodisuccinic acid (IDS), citric acid, aspartic acid-N,N-diacetic acid (ASDA) its salts and mixtures thereof. Especially preferred complexing agent for use herein is a salt of MGDA, in particular the trisodium salt of MGDA. Mixture of citrate and the trisodium salt of MGDA are also preferred for use herein. The composition preferably comprises from 10% to 60%, preferably from 20% to 40%, more preferably from 20% to 35% by weight of the composition of a complexing agent. Preferably, the composition comprises from 15% to 40% by weight of the composition of the trisodium salt of MGDA.

Builder

The fluid may include an inorganic builder. Suitable inorganic builders are selected from the group consisting of carbonate, silicate and mixtures thereof. Especially preferred for use herein are sodium carbonate and silicate. Preferably the composition comprises from 5 to 50%, more preferably from 10 to 40% and especially from 15 to 30% of sodium carbonate by weight of the composition.

Enzymes

The fluid may include an enzyme. Enzymes may include amylases and proteases.

In describing enzyme variants herein, the following nomenclature is used for ease of reference: Original amino acid(s):position(s): substituted amino acid(s). Standard enzyme IUPAC 1-letter codes for amino acids are used.

Suitable proteases include metalloproteases and serine proteases, including neutral or alkaline microbial serine proteases, such as subtilisins (EC 3.4.21.62) as well as chemically or genetically modified mutants thereof. Suitable proteases include subtilisins (EC 3.4.21.62), including those derived from *Bacillus*, such as *Bacillus lentus, B. alkalophilus, B. subtilis, B. amyloliquefaciens, Bacillus pumilus* and *Bacillus gibsonii.*

Especially preferred proteases are polypeptides demonstrating at least 90%, preferably at least 95%, more preferably at least 98%, even more preferably at least 99% and especially 100% identity with the wild-type enzyme from *Bacillus lentus*, comprising mutations in one or more, preferably two or more and more preferably three or more of the following positions, using the BPN' numbering system and amino acid abbreviations as illustrated in WO00/37627, which is incorporated herein by reference:V68A, N87S, S99D, S99SD, S99A, S101G, S101M, S103A, V104N/I, G118V, G118R, S128L, P129Q, S130A, Y167A, R1705, A194P, V2051 and/or M222S.

Most preferably the protease is selected from the group comprising the below mutations (BPN' numbering system) versus either the PB92 wild-type (SEQ ID NO:2 in WO 08/010925) or the subtilisin 309 wild-type (sequence as per PB92 backbone, except comprising a natural variation of N87S).

G118V+S128L+P129Q+S130A (i)

S101M+G118V+S128L+P129Q+S130A (ii)

N76D+N87R+G118R+S128L+P129Q+S130A+S188D+N248R (iii)

N76D+N87R+G118R+S128L+P129Q+S130A+S188D+V244R (iv)

N76D+N87R+G118R+S128L+P129Q+S130A (v)

V68A+N87S+S101G+V104N (vi)

Suitable commercially available protease enzymes include those sold under the trade names Savinase®, Polarzyme®, Kannase®, Ovozyme®, Everlase® and Esperase® by Novozymes A/S (Denmark), those sold under the tradename Properase®, Purafect®, Purafect Prime®, Purafect Ox®, FN3®, FN4®, Excellase®, Ultimase® and Purafect OXP® by Genencor International, those sold under the tradename Opticlean® and Optimase® by Solvay Enzymes, those available from Henkel/Kemira, namely BLAP.

Preferred levels of protease in the second composition include from about 0.2 to about 2 mg of active protease per grams of the composition.

The fluid may include amylases. A preferred alkaline amylase is derived from a strain of *Bacillus*, such as *Bacillus licheniformis, Bacillus amyloliquefaciens, Bacillus stearothermophilus, Bacillus subtilis*, or other *Bacillus* sp., such as *Bacillus* sp. NCIB 12289, NCIB 12512, NCIB 12513, DSM 9375 (U.S. Pat. No. 7,153,818) DSM 12368, DSMZ no. 12649, KSM AP1378 (WO 97/00324), KSM K36 or KSM K38 (EP 1,022,334). Preferred amylases include:

(a) the variants described in U.S. Pat. No. 5,856,164 and WO99/23211, WO 96/23873, WO00/60060 and WO 06/002643, especially the variants with one or more substitutions in the following positions versus the AA560 SEQ ID No. 3: 9, 26, 30, 33, 82, 37, 106, 118, 128, 133, 149, 150, 160, 178, 182, 186, 193, 195, 202, 214, 231, 256, 257, 258, 269, 270, 272, 283, 295, 296, 298, 299, 303, 304, 305, 311, 314, 315, 318, 319, 320, 323, 339, 345, 361, 378, 383, 419, 421, 437, 441, 444, 445, 446, 447, 450, 458, 461, 471, 482, 484, preferably that also contain the deletions of D183* and G184*.

(b) variants exhibiting at least 95% identity with the wild-type enzyme from *Bacillus* sp.707 (SEQ ID NO:7 in U.S. Pat. No. 6,093,562), especially those comprising one or more of the following mutations M202, M208, 5255, R172, and/or M261. Preferably said amylase comprises one of M202L or M202T mutations.

Suitable commercially available alpha-amylases include DURAMYL®, LIQUEZYME®, TERMAMYL®, TERMAMYL ULTRA®, NATALASE®, EVEREST®, SUPRAMYL®, STAINZYME®, STAINZYME PLUS®, FUNGAMYL® and BAN® (Novozymes A/S, Bagsvaerd, Denmark), KEMZYM® AT 9000 Biozym Biotech Trading GmbH Wehlistrasse 27b A-1200 Wien Austria, RAPIDASE®, PURASTAR®, ENZYSIZE®, OPTISIZE HT PLUS®, POWERASE®, EXCELLENZ™ S series, including EXCELLENZ™ S 1000 and EXCELLENZ™ S 2000 and PURASTAR OXAM® (DuPont Industrial Biosciences, Palo Alto, California) and KAM® (Kao, 14-10 Nihonbashi Kayabacho, 1-chome, Chuo-ku Tokyo 103-8210, Japan). Amylases especially preferred for use herein include NATALASE®, STAINZYME®, STAINZYME PLUS®, EXCELLENZ™ S 1000, EXCELLENZ™ 52000 and mixtures thereof.

Preferably, the composition comprises at least 0.005 mg, preferably from about 0.0025 to about 0.025, more preferably from about 0.05 to about 0.3, especially from about 0.01 to about 0.25 mg of active amylase.

Preferably, the protease and/or amylase of the composition are in the form of granulates, the granulates comprise more than 29% of sodium sulfate by weight of the granulate and/or the sodium sulfate and the active enzyme (protease and/or amylase) are in a weight ratio of between 3:1 and 100:1 or preferably between 4:1 and 30:1 or more preferably between 5:1 and 20:1.

Crystal Growth Inhibitor

Crystal growth inhibitors are materials that can bind to calcium carbonate crystals and prevent further growth of species such as aragonite and calcite.

Especially preferred crystal growth inhibitor for use herein is HEDP (1-hydroxyethylidene 1,1-diphosphonic acid). Preferably, the composition comprises from 0.01 to 5%, more preferably from 0.05 to 3% and especially from 0.5 to 2% of a crystal growth inhibitor by weight of the composition, preferably HEDP.

Bleach

The fluid may include bleach. The composition may comprise from about 8 to about 30%, more preferably from about 9 to about 25%, even more preferably from about 9 to about 20% of bleach by weight of the composition.

Inorganic and organic bleaches are suitable for use herein. Inorganic bleaches include perhydrate salts such as perborate, percarbonate, persulfate and persilicate salts. The inorganic perhydrate salts are normally the alkali metal salts. The inorganic perhydrate salt may be included as the crystalline solid without additional protection. Alternatively, the salt can be coated. Suitable coatings include sodium sulphate, sodium carbonate, sodium silicate and mixtures thereof. Said coatings can be applied as a mixture applied to the surface or sequentially in layers.

Alkali metal percarbonates, particularly sodium percarbonate is the preferred bleach for use herein. The percarbonate is most preferably incorporated into the products in a coated form which provides in-product stability.

Potassium peroxymonopersulfate is another inorganic perhydrate salt of utility herein.

Typical organic bleaches are organic peroxyacids, especially dodecanediperoxoic acid, tetradecanediperoxoic acid, and hexadecaneperoxoic acid. Mono- and diperazelaic acid, mono- and diperbrassylic acid are also suitable herein. Diacyl and Tetraacylperoxides, for instance dibenzoyl peroxide and dilauroyl peroxide, are other organic peroxides that can be used in the context of this disclosure.

Further typical organic bleaches include the peroxyacids, particular examples being the alkylperoxy acids and the arylperoxy acids. Preferred representatives are (a) peroxybenzoic acid and its ring-substituted derivatives, such as alkylperoxybenzoic acids, but also peroxy-α-naphthoic acid and magnesium monoperphthalate, (b) the aliphatic or substituted aliphatic peroxy acids, such as peroxylauric acid, peroxystearic acid, ε-phthalimidoperoxycaproic acid[phthaloiminoperoxyhexanoic acid (PAP)], o-carboxybenzamidoperoxycaproic acid, N-nonenylamidoperadipic acid and N-nonenylamidopersuccinates, and (c) aliphatic and araliphatic peroxydicarboxylic acids, such as 1,12-diperoxycarboxylic acid, 1,9-diperoxyazelaic acid, diperoxysebacic acid, diperoxybrassylic acid, the diperoxyphthalic acids, 2-decyldiperoxybutane-1,4-dioic acid, N,N-terephthaloyldi (6-aminopercaproic acid).

Bleach Activators

Bleach activators are typically organic peracid precursors that enhance the bleaching action in the course of cleaning at temperatures of 60° C. and below. Bleach activators suitable for use herein include compounds which, under perhydrolysis conditions, give aliphatic peroxycarboxylic acids having preferably from 1 to 12 carbon atoms, in particular from 2 to 10 carbon atoms, and/or optionally substituted perbenzoic acid. Suitable substances bear O-acyl and/or N-acyl groups of the number of carbon atoms specified and/or optionally substituted benzoyl groups. Preference is given to polyacylated alkylenediamines, in particular tetraacetylethylenediamine (TAED), acylated triazine derivatives, in particular 1,5-diacetyl-2,4-dioxohexahydro-1,3,5-triazine (DADHT), acylated glycolurils, in particular tetraacetylglycoluril (TAGU), N-acylamides, in particular N-nonanoylsuccinimide (NOSI), acylated phenolsulfonates, in particular n-nonanoyl- or isononanoyloxybenzenesulfonate (n- or iso-NOBS), decanoyloxybenzoic acid (DOBA), carboxylic anhydrides, in particular phthalic anhydride, acylated polyhydric alcohols, in particular triacetin, ethylene glycol diacetate and 2,5-diacetoxy-2,5-dihydrofuran and also trimethylacetyl citrate (TEAC). If present the composition comprises from 0.01 to 5, preferably from 0.2 to 2% by weight of the composition of bleach activator, preferably TAED.

Bleach Catalyst

The fluid may include a bleach catalyst, preferably a metal containing bleach catalyst. More preferably the metal containing bleach catalyst is a transition metal containing bleach catalyst, especially a manganese or cobalt-containing bleach catalyst.

Bleach catalysts preferred for use herein include manganese triazacyclononane and related complexes; Co, Cu, Mn and Fe bipyridylamine and related complexes; and pentamine acetate cobalt(III) and related complexes.

The composition may comprise from 0.001 to 0.5, more preferably from 0.002 to 0.05% of bleach catalyst by weight of the composition. Preferably the bleach catalyst includes a manganese bleach catalyst.

Metal Care Agents

The fluid may include a metal care agent. Metal care agents may prevent or reduce the tarnishing, corrosion or oxidation of metals, including aluminium, stainless steel and non-ferrous metals, such as silver and copper. Preferably the composition comprises from 0.1 to 5%, more preferably from 0.2 to 4% and specially from 0.3 to 3% by weight of the composition of a metal care agent, preferably the metal care agent is benzo triazole (BTA).

Glass Care Agents

The fluid may include a glass care agent. Glass care agents protect the appearance of glass items during the dishwashing process. Preferably the composition comprises from 0.1 to 5%, more preferably from 0.2 to 4% and especially from 0.3 to 3% by weight of the composition of a glass care agent, preferably the glass care agent is a zinc salt.

The composition may preferably be a rinse aid.

When the composition is a rinse aid, it preferably has a pH as measured in 1% weight/volume aqueous solution in distilled water at 20° C. of from less than 8, more preferably less than 7.5.

Preferably, the Cleaning Composition Comprises:

i) from 5 to 50% by weight of the composition of a builder;
ii) from 0.5 to 10% by weight of the composition of detersive surfactant;
iii) from 5 to 50% by weight of the composition of a complexing agent, preferably the complexing agent comprises a salt of MGDA;
iv) xylanase and other enzymes, preferably an amylase and a protease;
v) optionally from 0.5 to 5% by weight of the composition of polymer;
vi) optionally from 5 to 20% by weight of the composition of bleach and more preferably a bleach catalyst;

Hydrotropes

The fluid may include a hydrotrope. A hydrotrope creates increased water solubility of hydrophobic materials and ensures physical stability of the composition. In embodiments, hydrotropes are low molecular weight aromatic sulfonate materials such as cumene sulfonate, xylene sulfonate and diallyldiphenyl oxide sulfonate materials. In other embodiments, hydrotropes are short chainlength alkyl sulfates with less than 10 carbon atoms in the alkyl chain.

A hydrotrope or combination of hydrotropes can be present in the compositions at an amount of from between about 1% to about 50% by weight of the composition. In other embodiments, a hydrotrope or combination of hydrotropes can be present at about 10% to about 30% by weight of the composition.

Carrier.

The rinse composition can be formulated as liquid compositions. Carriers can be included in such liquid formulations. Any carrier suitable for use in a rinse aid composition can be used in the present disclosure. For example, in embodiments the compositions include water as a carrier.

In embodiments, liquid rinse aid compositions according to the present disclosure will contain no more than about 98% by weight of the composition of water and typically no more than about 90% by weight of the composition of water. In other embodiments, liquid rinse aid compositions will contain at least 50% by weight of the composition of water, or at least 60% by weight of the composition of water as a carrier.

The fluid may include a pH regulator agent, glass care and/or metal care agents.

Every document cited herein, including any cross referenced or related patent or application, is hereby incorporated herein by reference in its entirety unless expressly excluded or otherwise limited. The citation of any document is not an admission that it is prior art with respect to any embodiment disclosed or claimed herein or that it alone, or in any combination with any other reference or references, teaches, suggests or discloses any such embodiment. Further, to the extent that any meaning or definition of a term in this document conflicts with any meaning or definition of the same term in a document incorporated by reference, the meaning or definition assigned to that term in this document shall govern.

For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”.

The subject matter of the present disclosure has been described in detail and by reference to specific embodiments. It should be understood that any detailed description of a component or feature of an embodiment does not necessarily imply that the component or feature is essential to the particular embodiment or to any other embodiment.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modifications and variations come within the scope of the appended claims and their equivalents. Unless otherwise stated within the application, all tests, properties, and experiments are conducted at room temperature and atmospheric pressure.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A partitioned solution cartridge for automatic distribution of dishwashing chemicals comprising:
   a protective top film, and
   a compartmentalized body comprising a plurality of contained solution sectors each comprising a fluid reservoir and a distribution chamber,
      wherein:
         the fluid reservoir is partially enclosed by a reservoir sidewall and the protective top film;
         the distribution chamber is partially enclosed by a chamber sidewall and the protective top film;
         the fluid reservoir and the distribution chamber are fluidly connected; and
         the plurality of contained solution sectors are fluidly separated from each other within the compartmentalized body via plastic seals.

2. The partitioned solution cartridge of claim 1, wherein the reservoir sidewall is heat sealed to the protective top film.

3. The partitioned solution cartridge of claim 1, wherein the chamber sidewall is heat sealed to the protective top film.

4. The partitioned solution cartridge of claim 1, wherein the plurality of contained solution sectors are each differently shaped from each other.

5. The partitioned solution cartridge of claim 1, wherein each fluid reservoir of the plurality of contained solution sectors are differently shaped from each other.

6. The partitioned solution cartridge of claim 1, wherein at least two of the fluid reservoirs of the plurality of contained solution sectors have mirrored symmetry.

7. The partitioned solution cartridge of claim 1, wherein the heat seals are curved and are asymmetrical to each other.

8. The partitioned solution cartridge of claim 1, wherein each of the plurality of contained solution sectors are separated via air gaps.

9. The partitioned solution cartridge of claim 1, wherein the partitioned solution cartridge does not comprise any folding lines that run across an entire length of the partitioned solution cartridge in any direction such that when the plurality of contained solution sectors have fluid, the partitioned solution cartridge cannot be folded by hand.

10. The partitioned solution cartridge of claim 1, wherein:
   the fluid reservoir and the distribution chamber are fluidly connected by a gravity drainage passage;
   the gravity drainage passage has an entrance defined by the reservoir sidewall and an endpoint defined by the chamber sidewall; and
   the gravity drainage passage is partially enclosed by a passage sidewall and the protective top film.

11. The partitioned solution cartridge of claim 1, wherein each of the plurality of contained solution sectors has an air vent.

12. The partitioned solution cartridge of claim 11, wherein:
   the fluid reservoir has a top end and a bottom end formed by the reservoir sidewall;
   the bottom end is positioned proximate to the distribution chamber;
   the top end is positioned opposite the bottom end;
      the air vent is positioned on the protective top film at least partially enclosing the fluid reservoir; and
      the air vent is positioned proximate the top end of the fluid reservoir.

13. The partitioned solution cartridge of claim 12, wherein:
   the fluid reservoir has an overall length defined by the top end and the bottom end; and
   the air vent is positioned on the protective top film proximate the top end of the fluid reservoir in an area spanning 10% of the overall length.

14. The partitioned solution cartridge of claim 13, wherein 10% of the overall length is from about 0.2 to about 2 cm.

15. The partitioned solution cartridge of claim 12, wherein the air vent is positioned vertically above a fluid level of the fluid within the fluid reservoir when the partitioned solution cartridge is positioned in the substantially vertical orientation.

16. The partitioned solution cartridge of claim 1, wherein the chamber sidewall has a rigidity greater than the reservoir sidewall.

17. The partitioned solution cartridge of claim 1, wherein the distribution chamber comprises a cylindrical shape.

18. The partitioned solution cartridge of claim 1, wherein:
   the plurality of contained solution sectors comprises 3 or more contained solution sectors;
   the plurality of contained solution sectors have a total combined volume from about 0.1 to about 1.5 liter; and the fluid reservoir has a depth from about 0.1 to about 6 cm.

19. The partitioned solution cartridge of claim 1, wherein:

the protective top film comprises polyethylene, polypropylene, polyethylene terephthalate, polyethylene terephthalate glycol, acrylonitrile butadiene styrene, polycarbonate, aluminum, ethylene vinyl alcohol, or combinations thereof; and the compartmentalized body comprises polyethylene, polypropylene, polyethylene terephthalate, polyethylene terephthalate glycol, acrylonitrile butadiene styrene, polycarbonate, or combinations thereof.

20. The partitioned solution cartridge of claim 1, wherein each of the plurality of contained solution sectors comprise chemically-distinct fluids.

* * * * *